(12) United States Patent  
Clarke et al.

(10) Patent No.: US 11,787,038 B2  
(45) Date of Patent: Oct. 17, 2023

(54) METHOD AND SYSTEM FOR INSTALLING BIRD FLIGHT DIVERTERS

(71) Applicant: FT HOLDINGS INC., Calgary (CA)

(72) Inventors: Daniel John Clarke, Calgary (CA); Romas Krivelis, Calgary (CA)

(73) Assignee: FT HOLDINGS INC., Calgary (CA)

( * ) Notice: Subject to any disclaimer, the term of this patent is extended or adjusted under 35 U.S.C. 154(b) by 135 days.

(21) Appl. No.: 17/181,297

(22) Filed: Feb. 22, 2021

(65) Prior Publication Data

US 2021/0268640 A1    Sep. 2, 2021

Related U.S. Application Data

(60) Provisional application No. 62/983,642, filed on Feb. 29, 2020.

(51) Int. Cl.
| | |
|---|---|
| *B25J 5/02* | (2006.01) |
| *A01M 29/32* | (2011.01) |
| *B23P 11/00* | (2006.01) |
| *B25J 11/00* | (2006.01) |
| B25J 9/00 | (2006.01) |
| B25J 5/00 | (2006.01) |
| H02G 7/12 | (2006.01) |
| H02G 7/14 | (2006.01) |
| B25J 9/16 | (2006.01) |

(52) U.S. Cl.
CPC ............... *B25J 5/02* (2013.01); *A01M 29/32* (2013.01); *B23P 11/00* (2013.01); *B25J 11/005* (2013.01); B25J 5/007 (2013.01); B25J 9/0021 (2013.01); B25J 9/1687 (2013.01); H02G 7/12 (2013.01); H02G 7/14 (2013.01)

(58) Field of Classification Search
CPC .. A01M 29/32; B25J 5/007; B25J 5/02; B25J 9/0021; B25J 9/1687; B25J 11/005; H02G 7/12; H02G 7/14; B23P 11/00
See application file for complete search history.

(56) References Cited

U.S. PATENT DOCUMENTS

| | | | |
|---|---|---|---|
| 5,425,328 A | 6/1995 | Larumbe | |
| 5,901,435 A | 5/1999 | Vallee | |
| 9,706,767 B2 * | 7/2017 | Spencer | A01M 29/32 |
| 2012/0255503 A1 * | 10/2012 | Spencer | A01M 29/06 |
| | | | 119/713 |
| 2013/0104798 A1 * | 5/2013 | Spencer | A01M 29/10 |
| | | | 116/22 A |

(Continued)

FOREIGN PATENT DOCUMENTS

| | | |
|---|---|---|
| WO | 2013155653 A1 | 10/2013 |
| WO | 2019171231 A1 | 9/2019 |

OTHER PUBLICATIONS

Canadian Office Action corresponding to application No. 3,109,306 dated Jun. 22, 2022.

(Continued)

*Primary Examiner* — Jermie E Cozart  
(74) *Attorney, Agent, or Firm* — Finch & Maloney PLLC

(57) ABSTRACT

A system and method for installing bird flight diverters on wires, such as power lines and guy wires, is described. The system and method include the use of an unmanned aerial vehicle to place a robotic line crawler onto wires where the line crawler is configured to place bird flight diverters on the wire as the line crawler travels along the wire.

34 Claims, 28 Drawing Sheets

(56) References Cited

U.S. PATENT DOCUMENTS

2013/0298845 A1* 11/2013 Blanchard ............ A01M 29/08
 119/713
2021/0013705 A1 1/2021 Miron et al.

OTHER PUBLICATIONS

Canadian Office Action Corresponding to 3,109,306 dated Mar. 23, 2023.

* cited by examiner

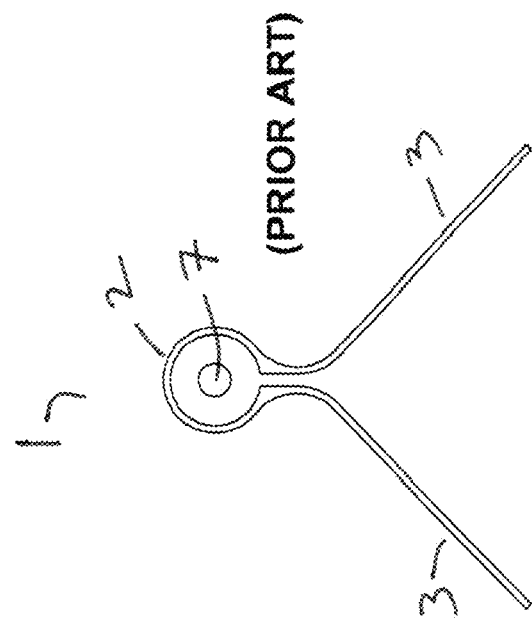
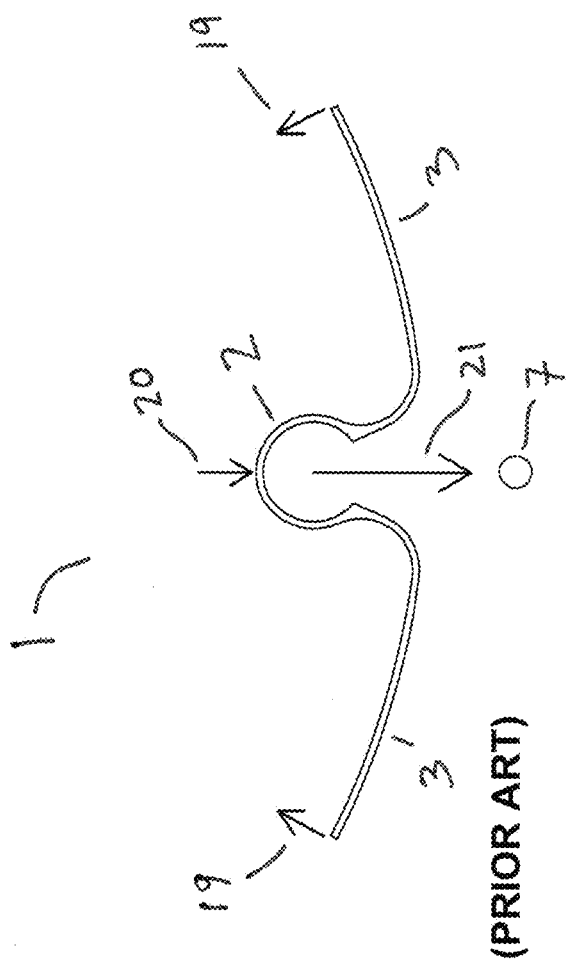

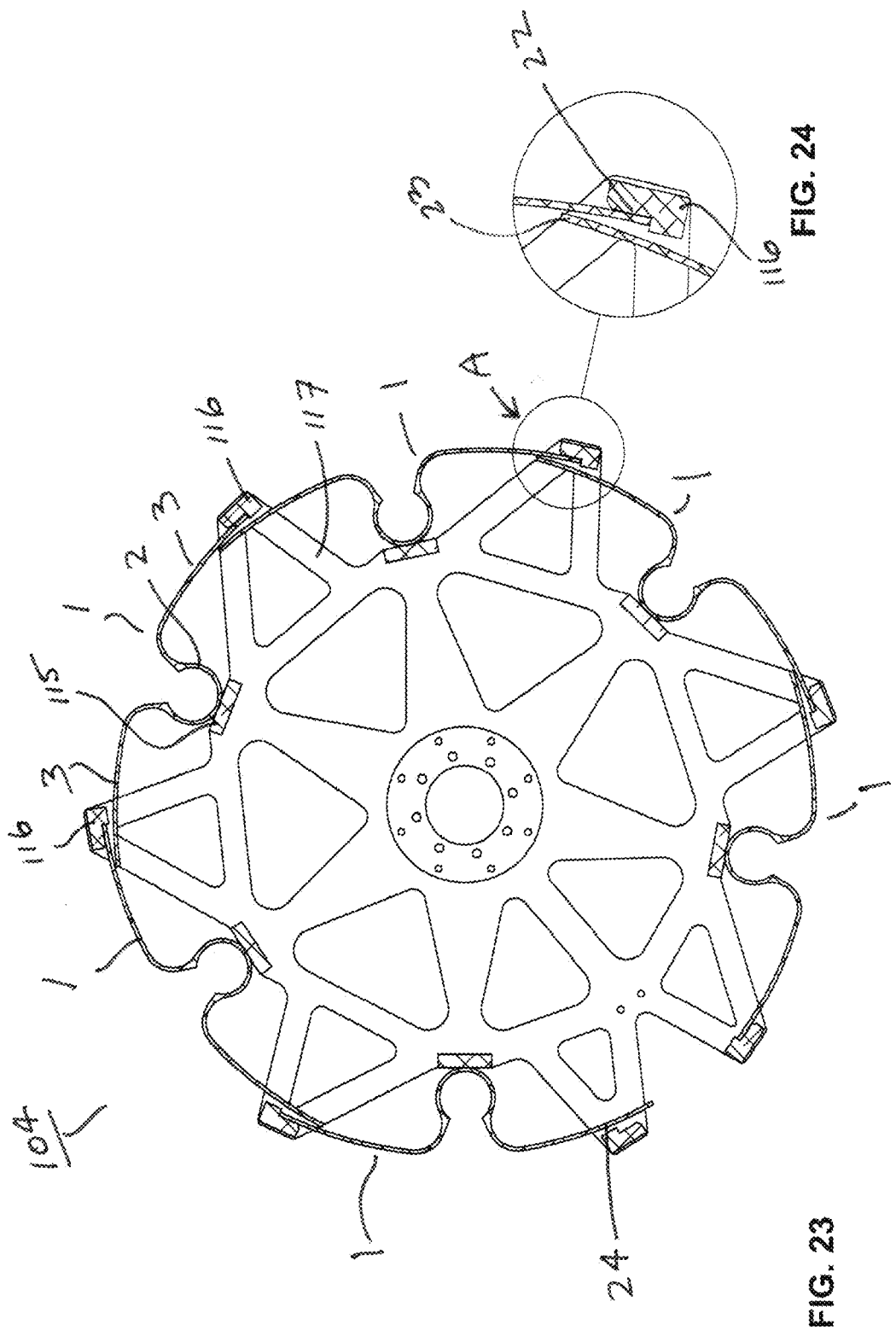

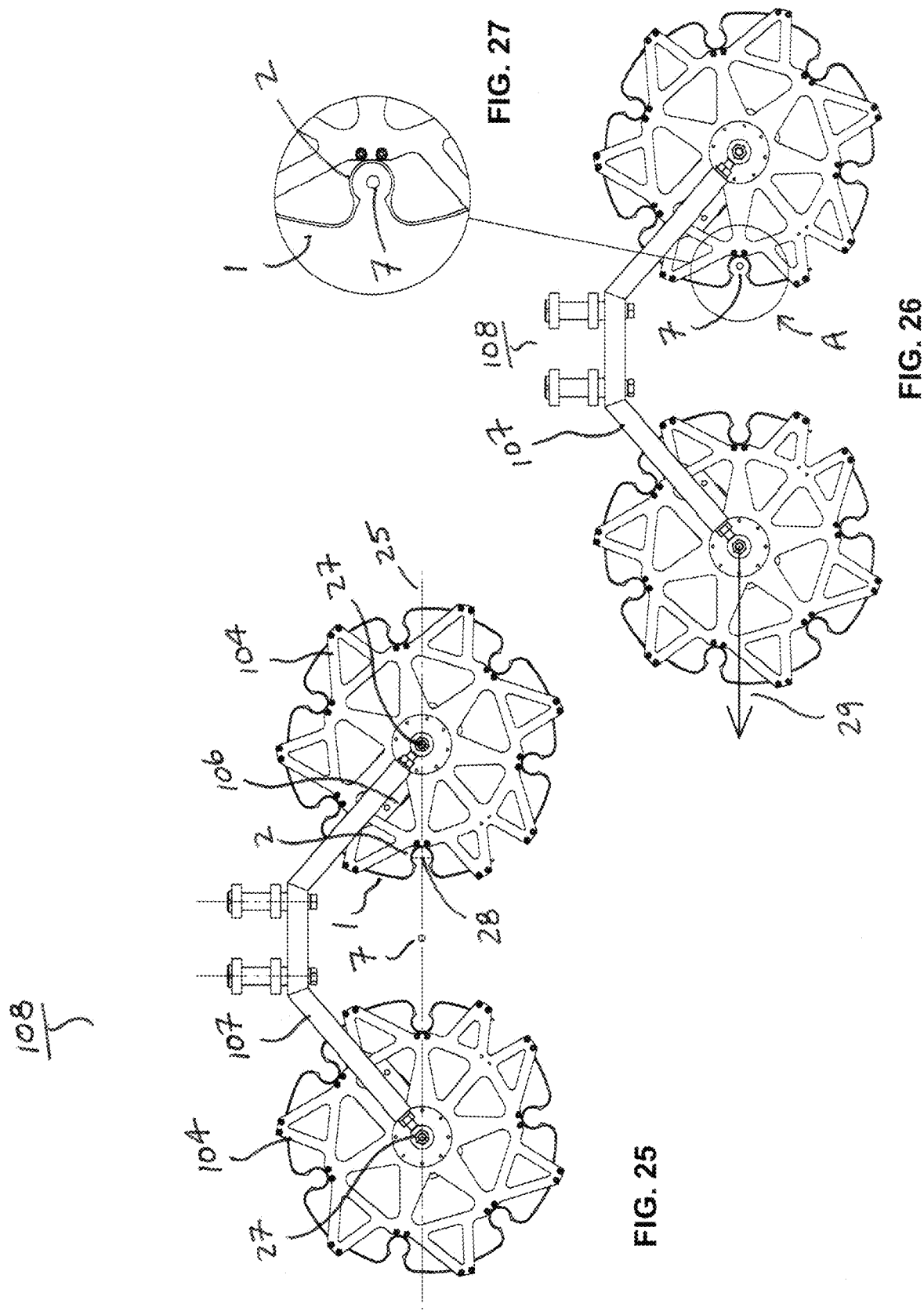

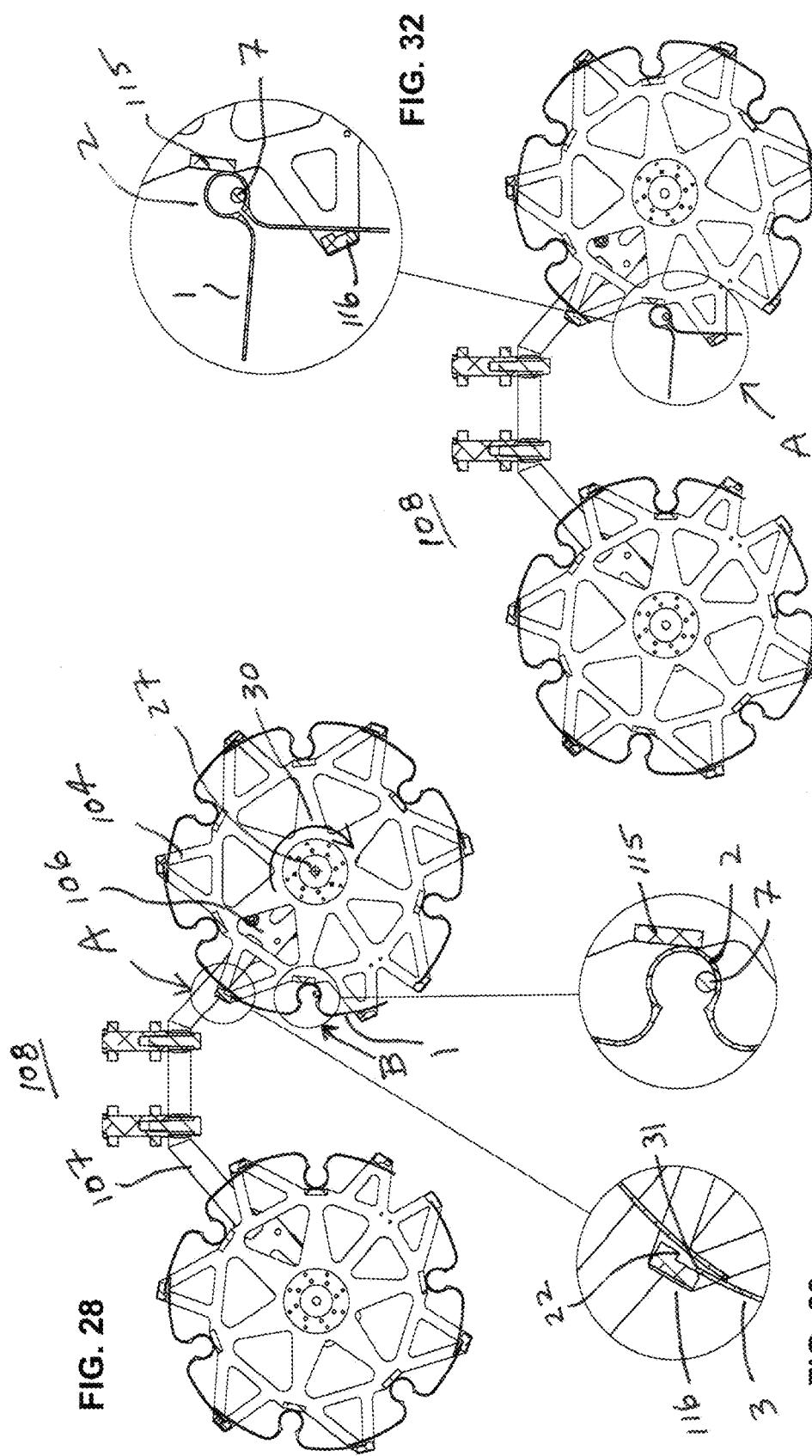

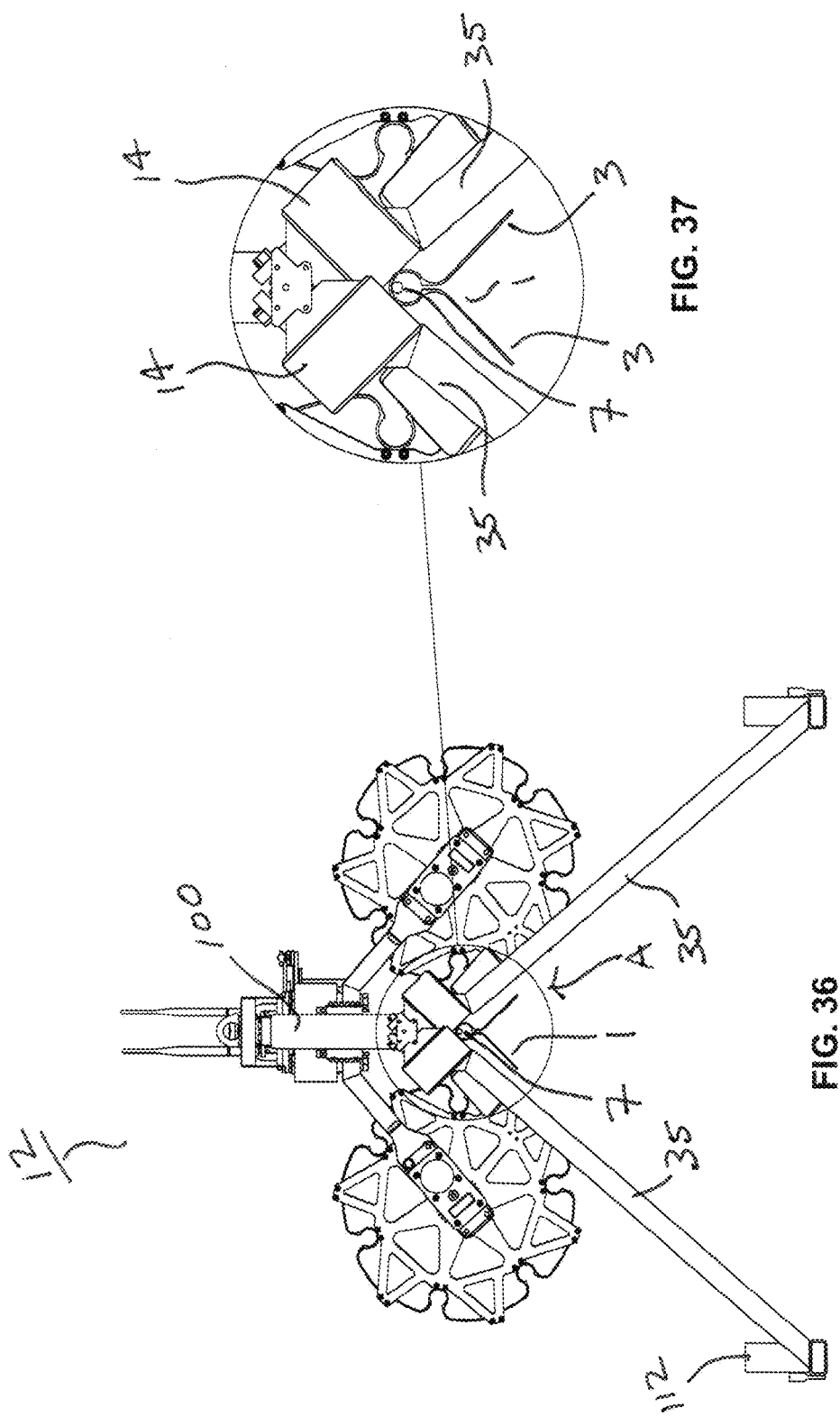

METHOD AND SYSTEM FOR INSTALLING BIRD FLIGHT DIVERTERS

CROSS-REFERENCE TO RELATED APPLICATIONS

This application claims priority of U.S. provisional patent application Ser. No. 62/983,642 filed Feb. 28, 2020, which is incorporated by reference into this application in its entirety.

TECHNICAL FIELD

The present disclosure is related to the field of methods and systems for installing bird flight diverters on wires including, but not limited to, power lines and guy wires, in particular, systems and methods comprising a remotely controllable line crawlers configured to place bird flight diverters along the wire as the line crawler travels along the wire.

BACKGROUND

Physical contact between birds and power lines is a problem. When a bird makes contact with a live power line, it creates a hazard for both the power grid and for the bird. Bird flight diverters are devices placed on power lines, guy wires and shield wires to provide a means to visibly alert birds to the wires with the intent to divert the bird's flight from the wires.

Referring to FIGS. 1 to 5, a prior art bird flight diverter 1 is shown, as manufactured by Power line Sentry of Denver, Colorado, USA, under U.S. Pat. No. 8,438,998, which is incorporated by reference into this application in its entirety. The purpose of this device is to be affixed to a power line shield or conductor wire to make the wires visible to wildlife such as birds. This reduces the incidence of wildlife striking the power line which can cause either injury or death to the animal as well as damage to the electrical power transmission infrastructure. These devices are installed at regular intervals along the wire at a spacing that is optimised to provide maximum visibility to wildlife while still being cost effective.

In some embodiments, diverter 1 can comprise of one barrel 2 and two wings 3 extending therefrom as shown in FIGS. 1 and 2. Barrel 2 is designed to fit over wire 7 to attach diverter 1 to the wire. Wings 3 are joined to barrel 2 and can provide a large surface area to maximise visibility of the device. Diverters 1 can be made of an ultraviolet resistant plastic covered with fluorescent reflective tape to make them flexible for installation on a wire.

Prior art methods of installing bird flight diverters 1 on power lines include using a helicopter flying in close proximity to the power line with a human riding in the helicopter reaching out of the cabin to install the diverters on the power line by hand. The current method of attaching diverter 1 to wire 7 is shown in FIG. 3. Before installation, force is applied by hand to the tips of wings 3 as indicated by force arrows 19. An additional force is applied to barrel 2 as indicated by force arrow 20. This elastically deforms diverter 1 into the shape shown in FIG. 3. Once diverter 1 is deformed in such a manner, wire 7 can be inserted into barrel 2 by moving diverter 1 in the direction indicated by arrow 21. Once wire 7 is inserted into barrel 2, forces 19 are removed and diverter 1 returns to its undeformed shape, trapping wire 7 inside barrel 2 thereby securing the diverter to the wire as shown in FIG. 4. This is repeated in a sequence, where multiple bird flight diverters 1 are installed along wire 7 with a predetermined gaps therebetween, as shown in FIG. 5, where multiple diverters 1 are installed on wire 7 with a predetermined gap between each diverter 1.

This method of installation is extremely dangerous and very expensive.

It is, therefore, desirable to provide a system and method of installing bird flight diverters on wires that is safer and cheaper.

SUMMARY

A method and system for installing bird flight diverters onto a suspended wire is provided. The system can comprise a robotic line crawler and an unmanned aerial vehicle configured to lift the line crawler and place it onto the wire. The line crawler can be configured to move along the longitudinal length the wire and install a plurality of the bird flight diverters thereon.

Broadly stated, in some embodiments, a method can be provided for installing a plurality of bird flight diverters onto a longitudinal length of a wire, wherein each bird flight diverter comprises a barrel and a pair of wings extending therefrom, the method comprising: attaching a lifter to a robotic line crawler, the line crawler configured to hold a plurality of the bird flight diverters; lifting the robotic line crawler with the lifter off of a ground surface; placing the line crawler on the wire, the line crawler further configured to traverse along the longitudinal length of the wire; moving the line crawler along the longitudinal length of the wire; and installing one or more of the plurality of the bird flight diverters on the wire at pre-determined spaced-apart intervals along the wire.

Broadly stated, in some embodiments, the method can further comprise releasing the line crawler from the lifter after the line crawler is placed on the wire.

Broadly stated, in some embodiments, the method can further comprise lifting the line crawler from the wire with the lifter after the line crawler has placed one or more of the plurality of bird flight diverters onto the wire.

Broadly stated, in some embodiments, the method can further comprise returning the line crawler to the ground surface.

Broadly stated, in some embodiments, the method can further comprise loading one or more of the plurality of bird flight diverters onto the line crawler and repeating the steps of installing bird flight diverters onto the wire.

Broadly stated, in some embodiments, the method can comprise performing maintenance on the line crawler after it has been returned to the ground surface.

Broadly stated, in some embodiments, the method can further comprise attaching the lifter to the line crawler with a sling prior to lifting the line crawler off of the ground surface, the sling further comprising a remote pickup device configured to releasably attach to a guide cone disposed on the line crawler.

Broadly stated, in some embodiments, the method can further comprise releasing the remote pickup device from the guide cone after the line crawler is placed on the wire.

Broadly stated, in some embodiments, the method can further comprise attaching the lifter to the line crawler with a sling prior to lifting the line crawler off of the wire, the sling further comprising a remote pickup device configured to releasably attach to a guide cone disposed on the line crawler.

Broadly stated, in some embodiments, the method can further comprise returning the line crawler to the ground surface and releasing the remote pickup device from the guide cone after the line crawler is placed on the ground surface.

Broadly stated, in some embodiments, a system can be provided for installing a plurality of bird flight diverters onto a longitudinal length of a wire, wherein each bird flight diverter comprises a barrel and a pair of wings extending therefrom, the system comprising: a robotic line crawler, the line crawler configured to traverse along the longitudinal length of the wire, the line crawler further configured to hold the plurality of bird flight diverters, the line crawler further configured to install one or more of the plurality of bird flight diverters on the wire.

Broadly stated, in some embodiments, the system can comprise a lifter configured to attach to the line crawler and lift the line crawler off of a ground surface and place the line crawler on the wire.

Broadly stated, in some embodiments, the lifter can be configured to release the line crawler after the line crawler is placed on the wire.

Broadly stated, in some embodiments, the lifter can be configured to lift the line crawler from the wire after the line crawler has placed one or more of the plurality of bird flight diverters onto the wire.

Broadly stated, in some embodiments, the lifter can be configured to return the line crawler to the ground surface.

Broadly stated, in some embodiments, the line crawler can be configured to be loaded with one or more of the bird flight diverters.

Broadly stated, in some embodiments, the lifter can further comprise a sling, the sling comprising a remote pickup device configured to releasably attach to a guide cone disposed on the line crawler.

Broadly stated, in some embodiments, the remote pickup device can be configured to release from the guide cone after the line crawler is placed on the wire.

Broadly stated, in some embodiments, the remote pickup device can be configured to attach to the guide cone after the line crawler has placed one or more of the plurality the bird flight diverters onto the wire.

Broadly stated, in some embodiments, the lifter can be configured to lift the line crawler off of the wire and return the line crawler to the ground surface.

Broadly stated, in some embodiments, the lifter can comprise one or more of an unmanned aerial vehicle, a crane and a bucket truck.

Broadly stated, in some embodiments, the wire can comprise an electric power line or a guy wire.

Broadly stated, in some embodiments, the line crawler can comprise: a chassis comprising a plurality of motorized drive wheels operatively coupled thereto, wherein the plurality of motorized drive wheels are configured to travel along the wire; at least one drum assembly operatively coupled to the chassis via a linkage mechanism configured to move the at least one drum assembly side to side within the chassis, wherein the at least one drum assembly further comprises: a drum frame comprising a pair of drums rotatably coupled thereto wherein each drum is configured to releasably hold the plurality of bird flight diverters, and a drum servo motor operatively coupled to each drum, wherein the drum servo motor is configured to rotate the drum in the drum frame; and a battery configured to provide direct current ("DC") power, the battery operatively coupled to the motorized drive wheels, to the linkage mechanism, and to the drum servo motors to provide DC power thereto.

Broadly stated, in some embodiments, each drum can comprise: a pair of substantially parallel side plates; a plurality of barrel bars disposed between the side plates, the number of the plurality of barrel bars equaling the number of the bird flight diverters disposed in the drum; and a plurality of wing bars disposed between the side plates, the number of the plurality of wing bars equaling the number of the bird flight diverters disposed in the drum plus one.

Broadly stated, in some embodiments, the linkage mechanism can comprise: a center servo motor operatively coupled to the battery; a servo arm operatively coupled to the center servo motor; a plurality of swing arms rotatively coupled to the chassis, the plurality of swing arms operatively coupled to the drum frame; and a link arm operatively coupling the servo arm to the plurality of swing arms wherein rotation of the servo arm translates to side to side movement of the at least one drum assembly in the chassis.

Broadly stated, in some embodiments, the line crawler can comprise a control unit operatively coupled to the motorized drive wheels, to the linkage mechanism, and to the drum servo motors.

Broadly stated, in some embodiments, the line crawler can comprise a wireless receiver operatively coupled to the control unit, the wireless receiver configured for receiving a wireless data signal configured to control the motorized drive wheels, the linkage mechanism, and the drum servo motors.

Broadly stated, in some embodiments, the system can comprise a wireless transmitter configured for transmitting the wireless data signal.

BRIEF DESCRIPTION OF THE DRAWINGS

FIG. 3 is an end elevation view depicting the prior art bird flight diverter of FIG. 1 under force prior to installation on a wire.

FIG. 4 is an end elevation view depicting the prior art bird flight diverter of FIG. 3 installed on the wire.

FIG. 23 is a side elevation view depicting the drum of FIG. 22.

FIG. 24 is a side elevation view depicting Detail A of FIG. 23.

FIG. 25 is a front elevation view depicting the drum frame assemblies of the line crawler of FIG. 19.

FIG. 26 is a front elevation view depicting the drum frame assemblies of the line crawler of FIG. 20 in a first motion to install a bird flight diverter on the wire.

FIG. 27 is a front elevation view depicting Detail A of FIG. 26.

FIG. 28 is a front elevation view depicting the drum frame assemblies of the line crawler of FIG. 20 in a second motion to install a bird flight diverter on the wire.

FIG. 29 is a front elevation view depicting Detail A of FIG. 28.

FIG. 30 is a front elevation view depicting Detail B of FIG. 28.

FIG. 31 is a front elevation view depicting the drum frame assemblies of the line crawler of FIG. 20 after the bird flight diverter has been installed on the wire.

FIG. 32 is a front elevation view depicting Detail A of FIG. 31.

FIG. 36 is a front elevation view depicting the drum frame assemblies of the line crawler of FIG. 35 travelling over the installed bird flight diverter.

FIG. 37 is a front elevation view depicting Detail A of FIG. 36.

DETAILED DESCRIPTION OF EMBODIMENTS

Figure 2:
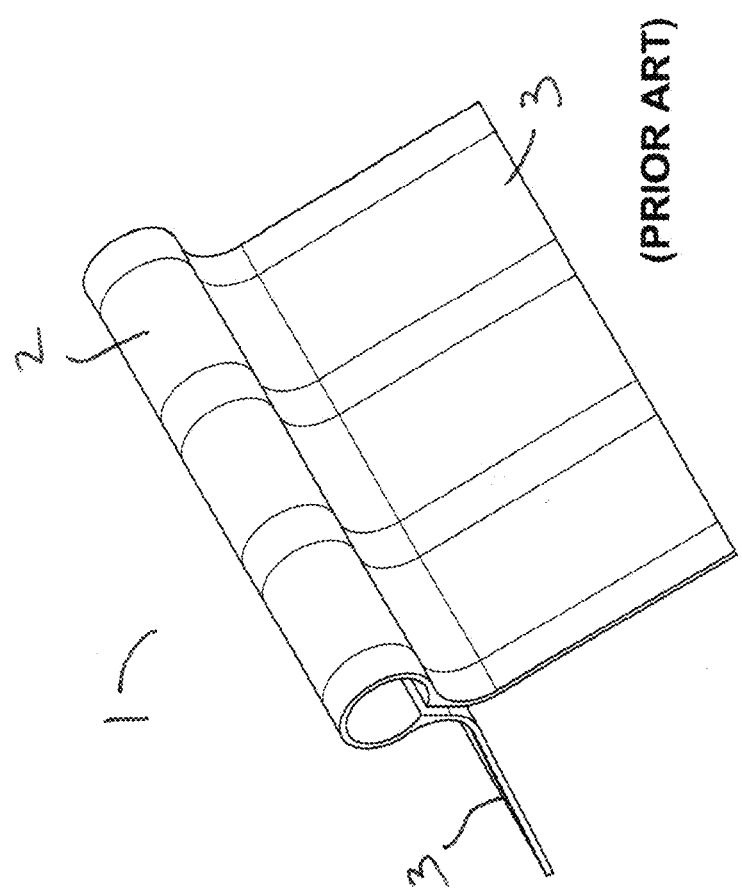
FIG. 2 is a perspective view depicting the prior art bird flight diverter of FIG. 1.
Figure 1:
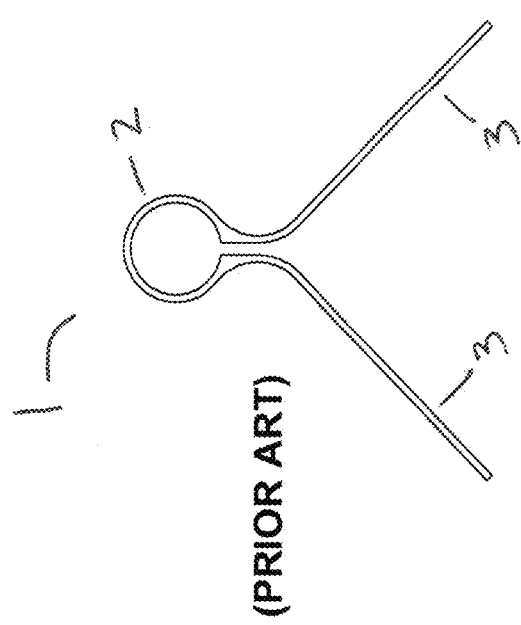
FIG. 1 is an end elevation view depicting a prior art bird flight diverter.
Figure 5:
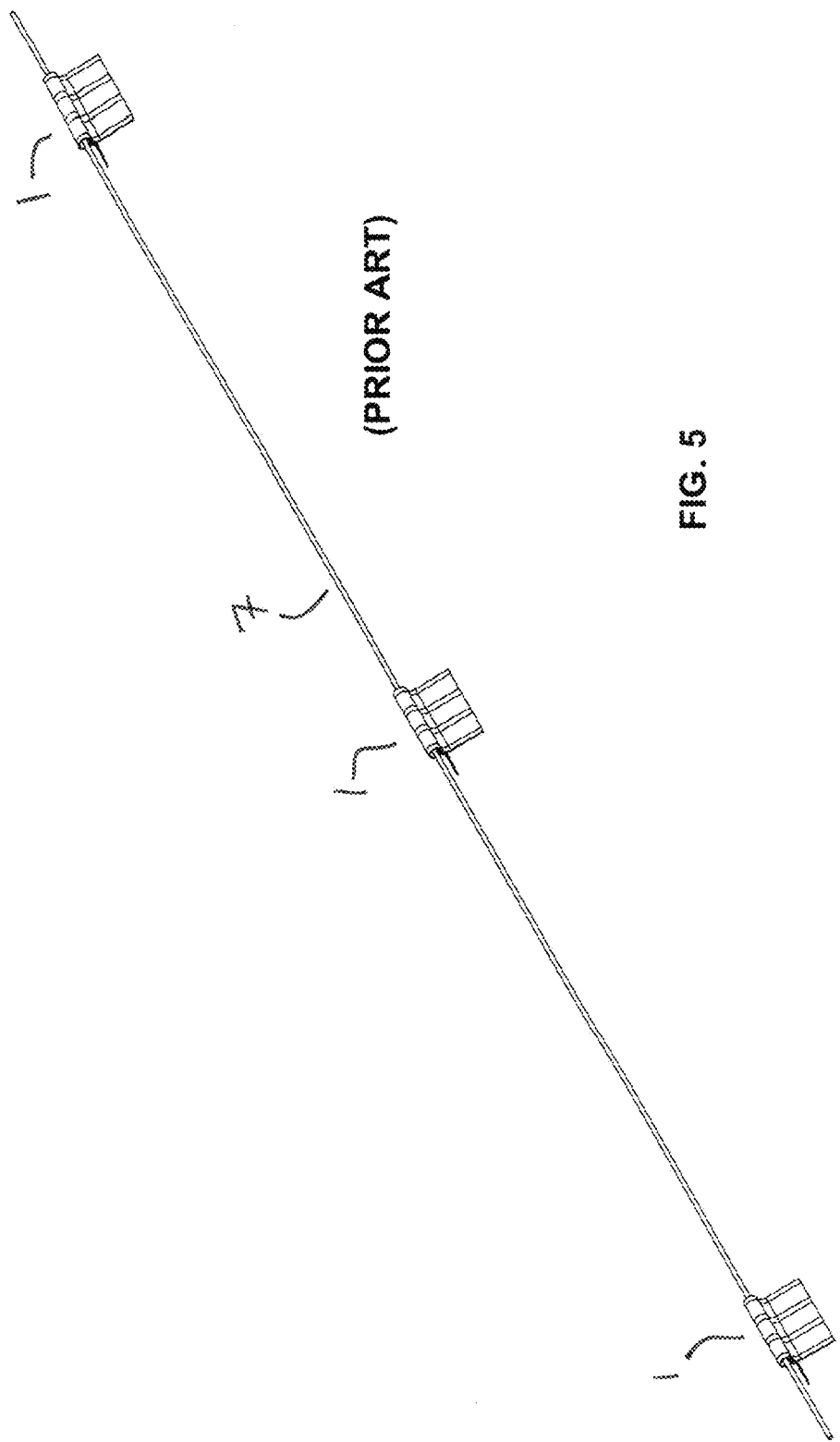
FIG. 5 is a perspective view depicting a plurality of the prior art bird diverters of FIG. 1 on a wire.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

Referring to FIGS. 6 to 15, one embodiment of a system to install bird flight diverts onto a wire Unmanned Aerial Vehicle ("UAV") 8 and robotic Line Crawler 12 is shown. In some embodiments, the main components of this system can comprise UAV 8, transport sling 9, guide cone 10, remote pickup device 11, line crawler 12, yaw control thrusters 13, powered wheels 14 and bird flight diverters 1. In some embodiments, UAV 8 can comprise an unmanned aerial vehicle as disclosed in international patent application no. PCT/CA2017/051458 filed 4 Dec. 2017, and in U.S. provisional patent application No. 62/831,247 filed 9 Apr. 2019, both of which are incorporated by reference into this application in their entirety.

Figure 6:
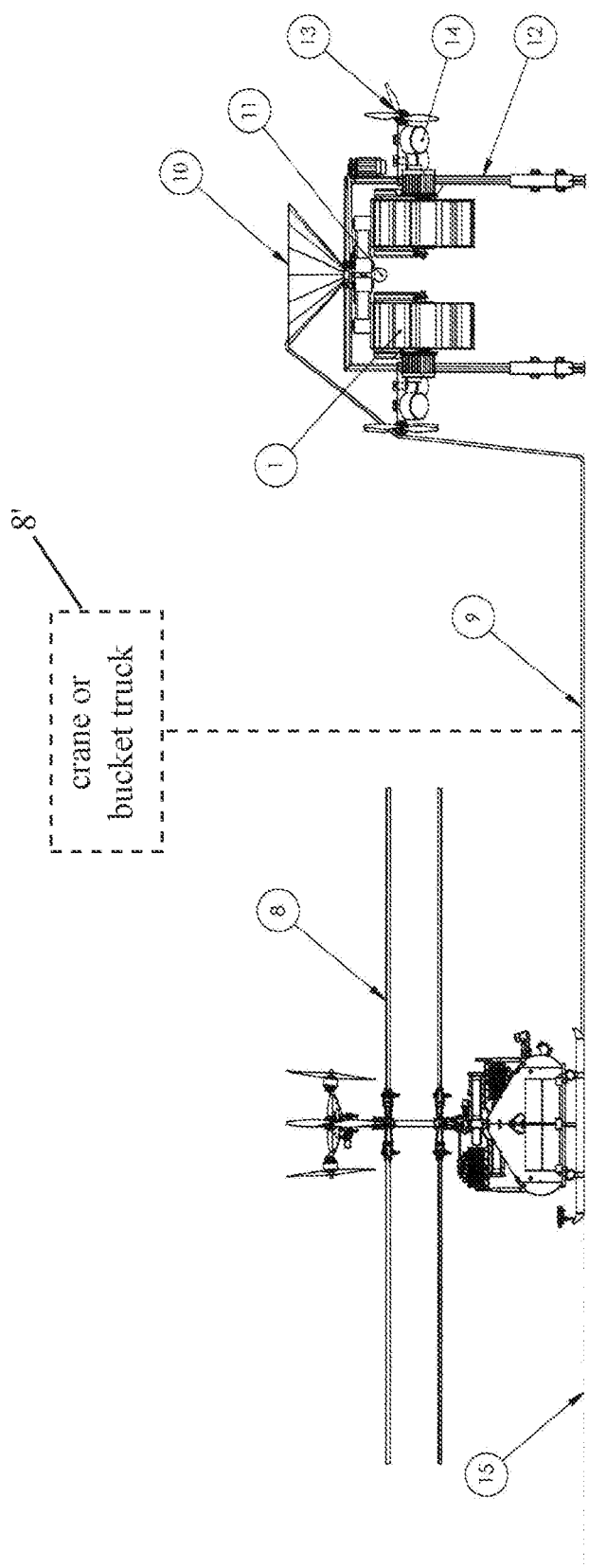
FIG. 6 is an elevation view depicting one embodiment of a system for installing bird flight diverters on the ground prior to flight.

FIG. 6 shows the configuration of equipment in the first step in the bird flight diverter installation operation. In this step, UAV 8 and line crawler 12 is placed on the ground denoted by line 15. The distance between them is such that they are close enough to be easily be connected together with sling 9, while being far enough apart so that UAV 8 will not strike line crawler 12 during takeoff. Line crawler 12 can then be loaded with a plurality of bird flight diverters 1 and made ready for installation by powering up line crawler 12 and initialising it. UAV 8 can also be made ready for flight by powering it up and initialising it ready for takeoff. Sling 9 can be connected between payload hook disposed on UAV 8 and remote pickup device 11. Remote pickup device 11 can then be inserted into guide cone 10 that can comprise a mechanism configured to lock onto remote pickup device 11 at the base of guide cone 10 when an engaging signal is sent to remote pickup device 11. This can lock remote pickup device 11 to the base of guide cone 10 and provides a secure connection to allow UAV 8 to pick up line crawler 12. UAV 8 can then be commanded to perform a takeoff and further commanded to fly to a position directly above line crawler 12. The altitude of UAV 8 can then be commanded to increase until sling 9 becomes taut whereupon UAV 8 can pick up line crawler 12.

Figure 7:
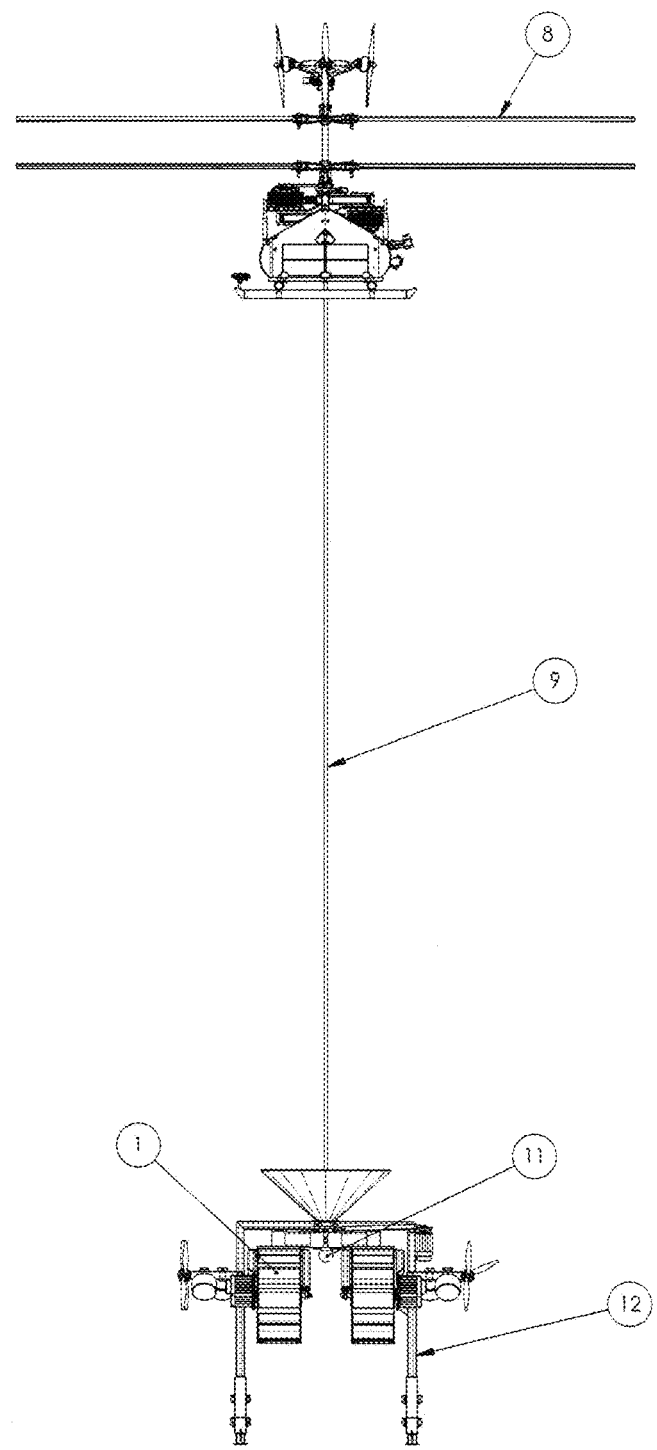
FIG. 7 is an elevation view depicting the system of FIG. 6 with an unmanned aerial vehicle in flight prior to lifting a line crawler off the ground with a sling.
Figure 8:
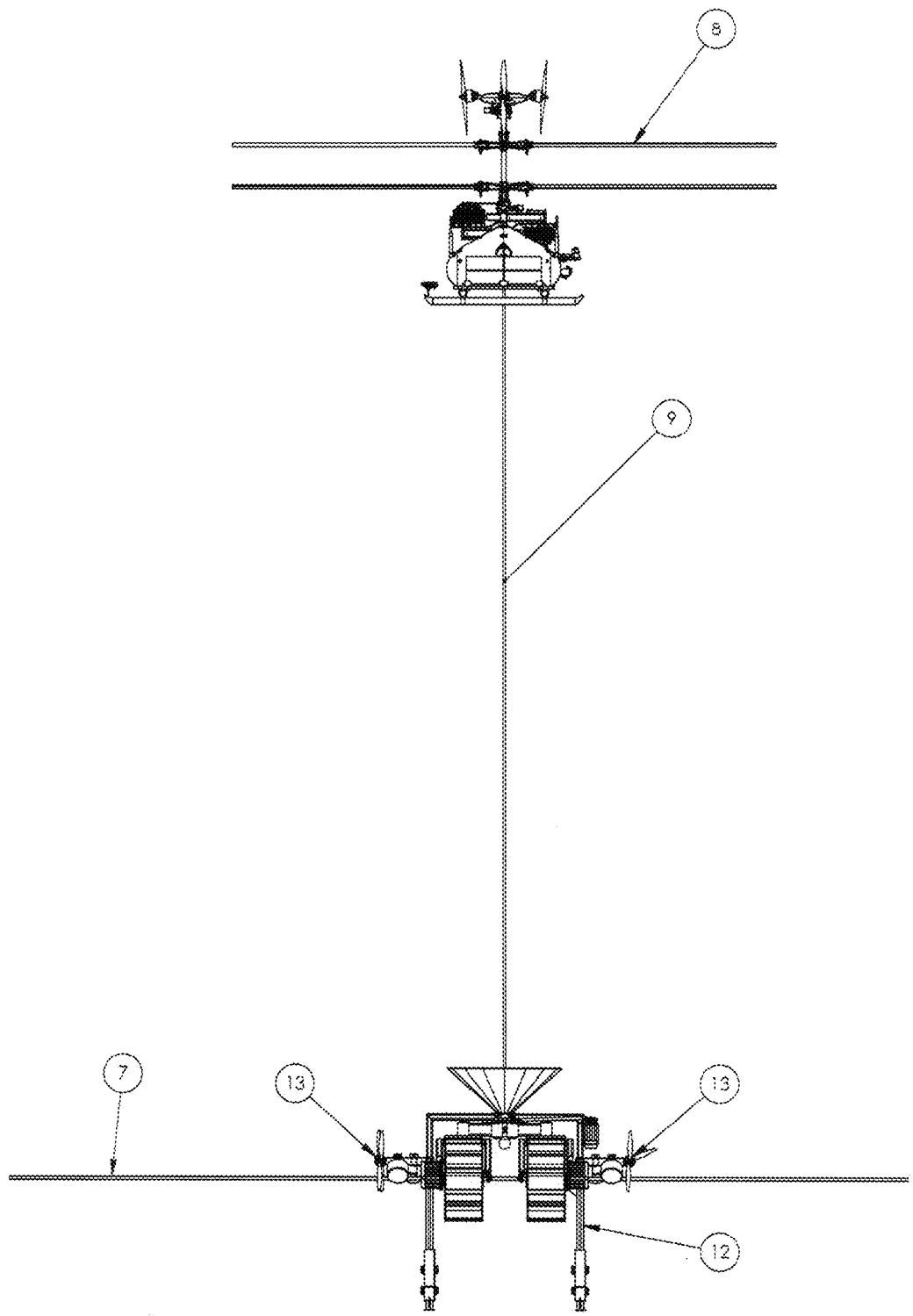
FIG. 8 is an elevation view depicting the system of FIG. 7 placing the line crawler on a wire.

Referring to FIG. 7, UAV 8 is shown in flight with line crawler 12 fully loaded with bird flight diverters 1. UAV 8 can then be commanded to fly to a position directly above wire 7, and line crawler 12 can be lowered onto wire 7 by commanding the altitude of UAV 8 to decrease. Wire 7 can comprise a power line wire, a guy wire or a shield wire although it is clear to those skilled in the art that wire 7 can comprise any type of aerially suspended wire or cable. During final alignment, yaw control thrusters 13 disposed on line crawler 12 can be controlled to rotate line crawler 12 with respect to a vertical axis to correctly align line crawler 12 with wire 7. Referring to FIG. 8, UAV 8 lowering line crawler 12 onto wire 7 is shown.

Figure 9:
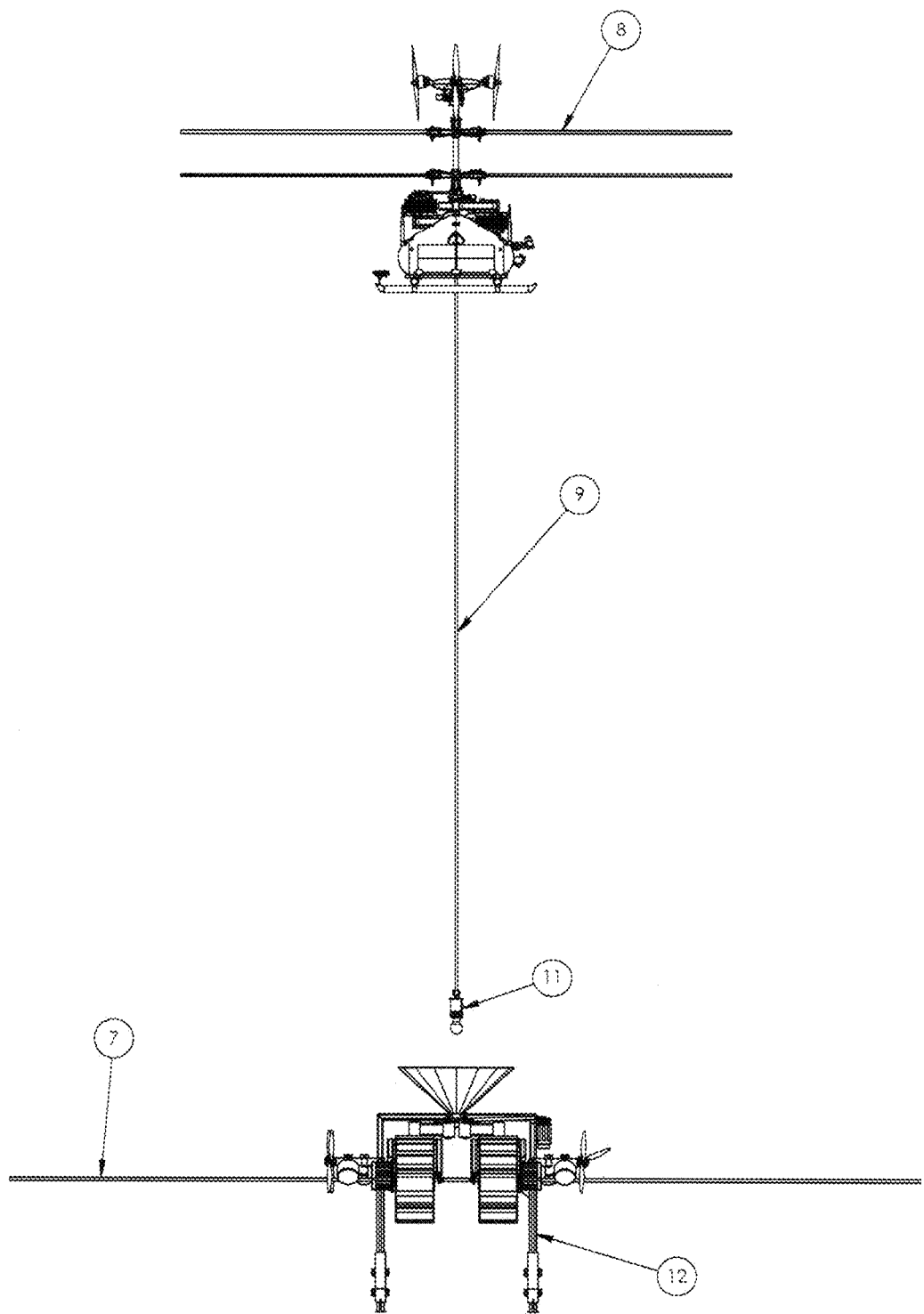
FIG. 9 is an elevation view depicting the system of FIG. 8 after the sling has been released from the line crawler.
Figure 10:
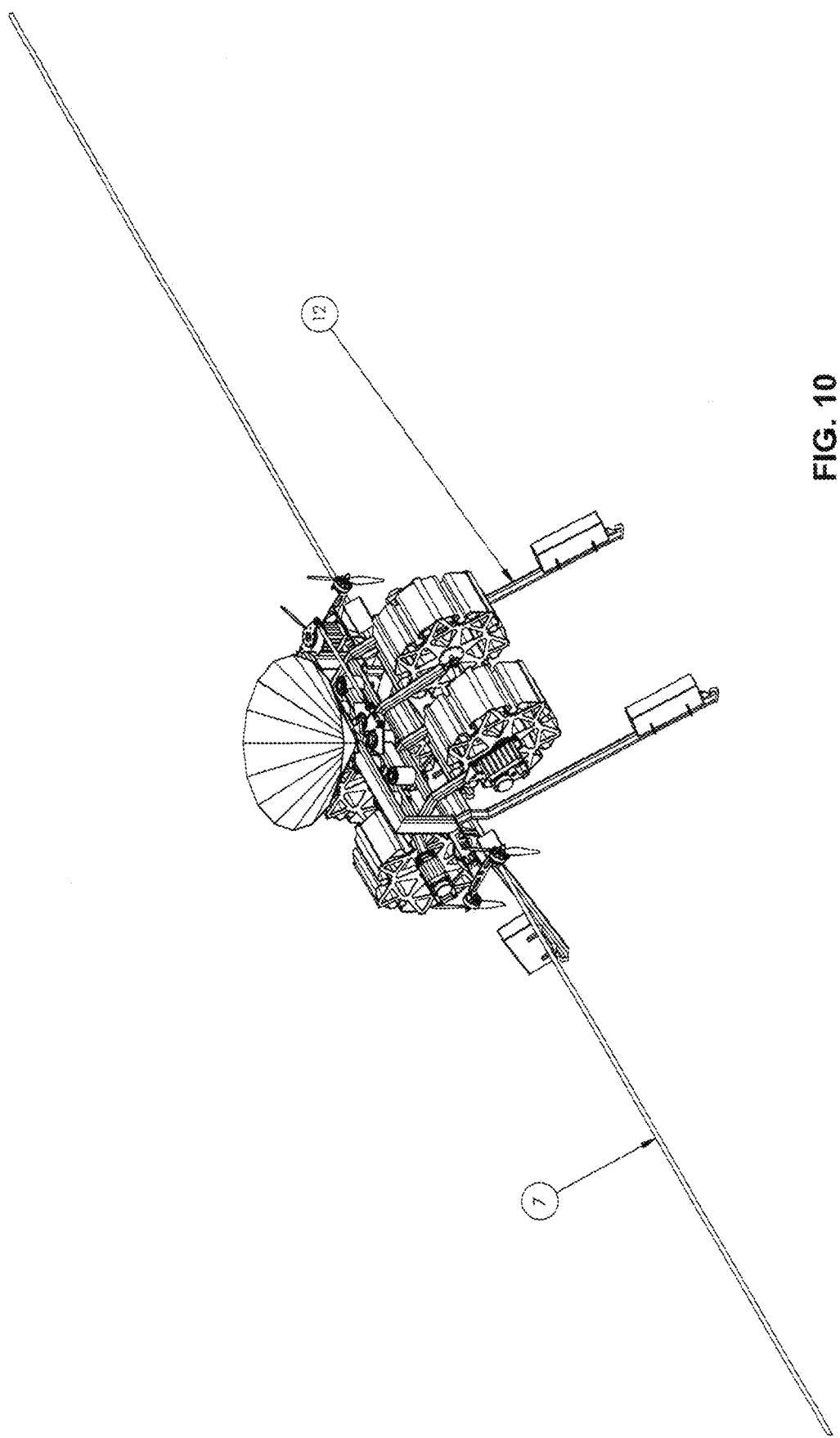
FIG. 10 is a perspective view depicting the line crawler of FIG. 9 on the wire prior to installing bird flight diverters.

Once line crawler 12 has been lowered onto wire 7, the mechanism that locks remote pickup device 9 to the base of guide cone 10 can be disengaged by sending a signal to remote pickup device 11. This mechanically disconnects remote pickup device 11 from the base of guide cone 10, thereby releasing UAV 8 and allowing UAV 8 to gain altitude and then move away from line crawler 12. FIG. 9 shows UAV 8 moving upwards and away from line crawler 12 after line crawler 12 has been placed on wire 7 and after remote pickup device 11 has been released from the base of guide cone 10. Once this procedure is complete, line crawler 12 can be moved to the correct position to begin installing bird flight diverters 1. UAV 8 can either be commanded to return to home and land, or it can hover near the worksite ready to retrieve line crawler 12 once it has completed the task of installing bird flight diverters 1. FIG. 10 shows a depiction of line crawler 12 disposed on wire 7, ready to begin work.

Figure 11:
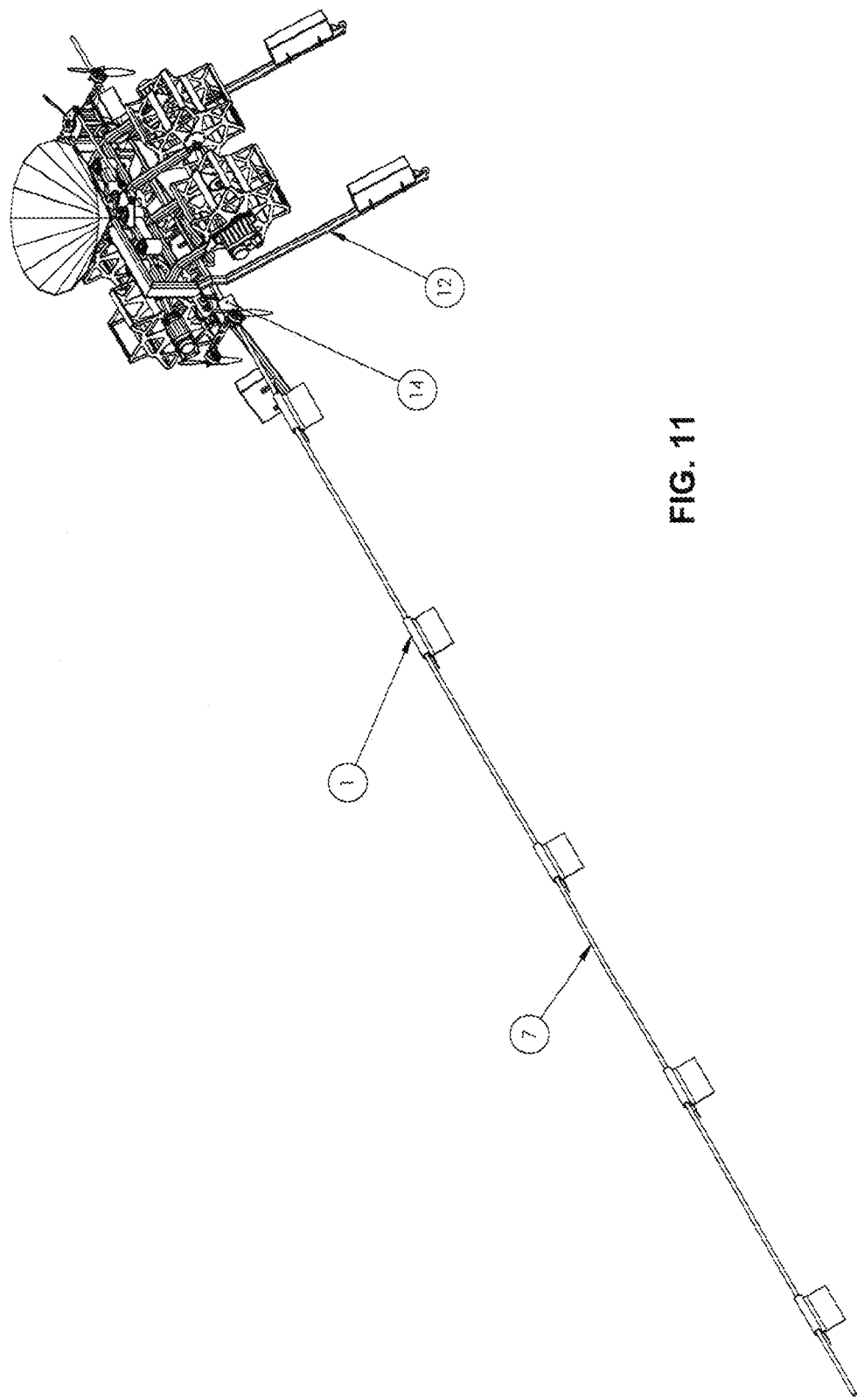
FIG. 11 is a perspective view depicting the line crawler of FIG. 10 after installing bird flight diverters on the wire.

FIG. 11 shows line crawler 12 after it has installed all of the bird flight diverters 1 that were originally loaded on line crawler 12 onto wire 7. In some embodiments, line crawler 12 can comprise powered wheels 14 that allow line crawler 12 to smoothly move along the longitudinal length of wire 7, stopping at regular, pre-determined spaced-apart intervals along wire 7 to install bird flight diverters 1 thereon. Once the process of installing bird flight diverters 1 onto wire 7 is complete, line crawler 12 can then be ready to be retrieved from wire 7 by UAV 8 and placed onto ground 15 to be reloaded with more bird flight diverters 1.

Figure 12:
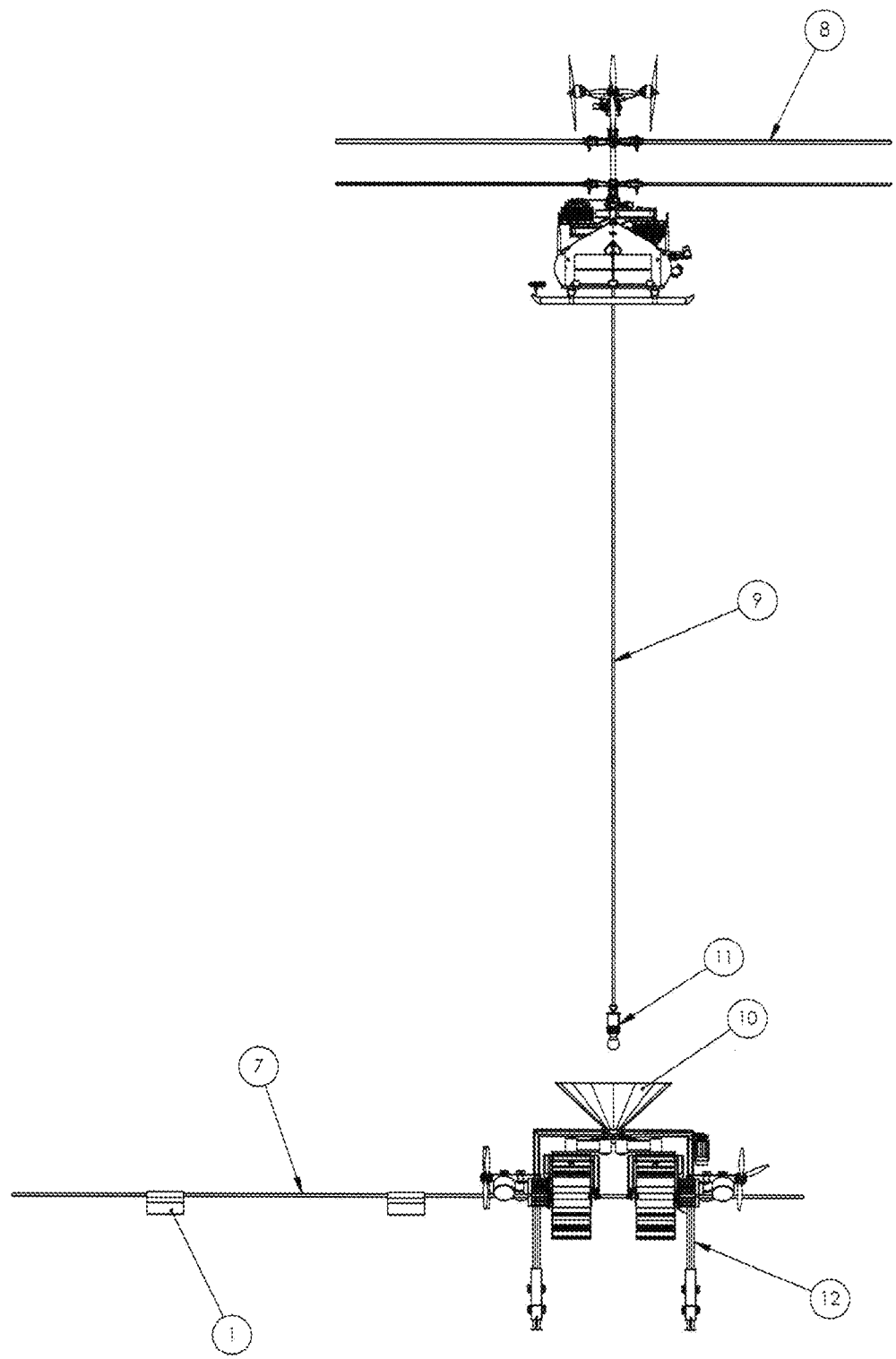
FIG. 12 is an elevation view depicting the line crawler of FIG. 11 prior to being retrieved from the wire by the unmanned aerial vehicle.
Figure 13:
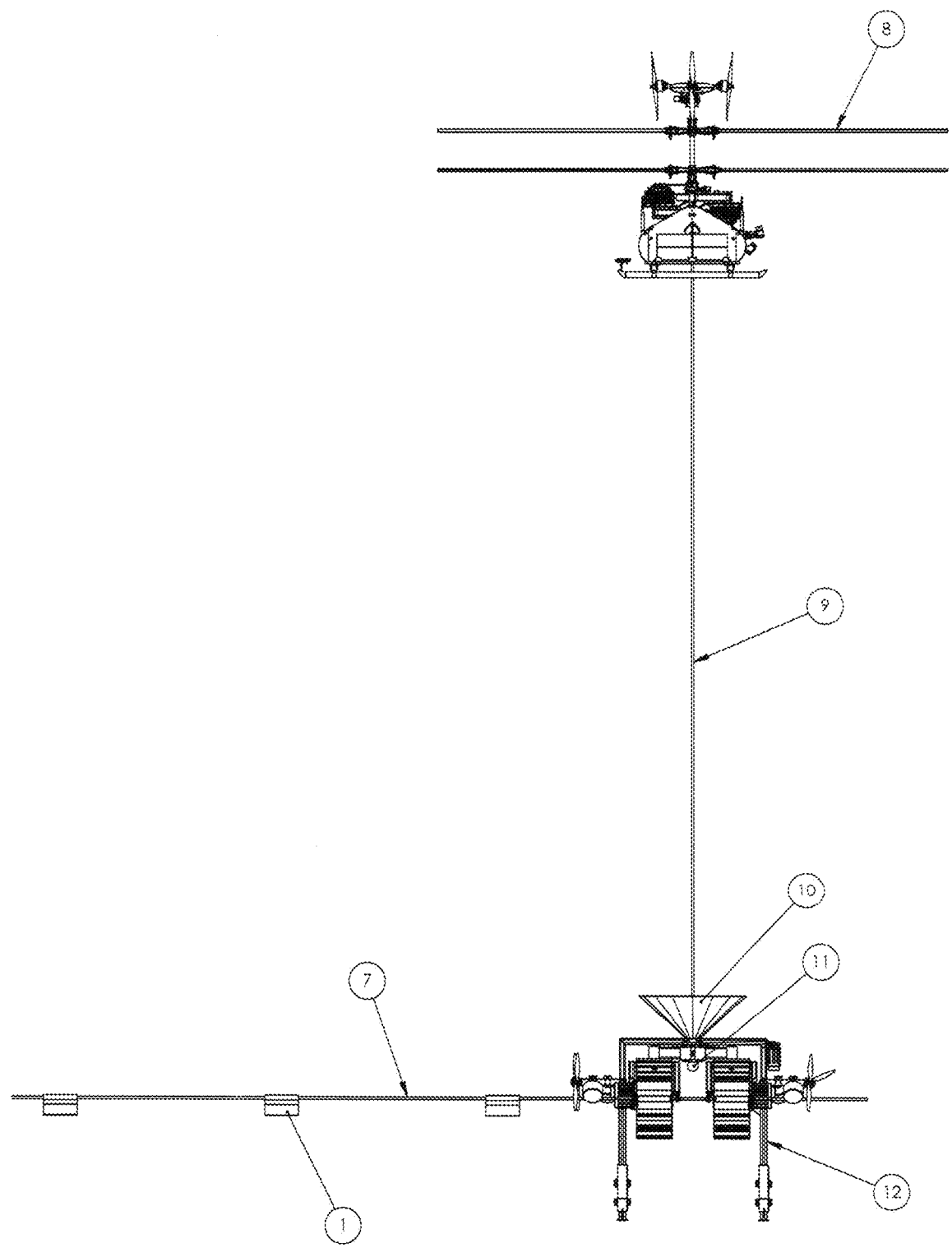
FIG. 13 is an elevation view depicting line crawler of FIG. 12 attached to the unmanned aerial vehicle prior to being lifted off of the wire.
Figure 14:
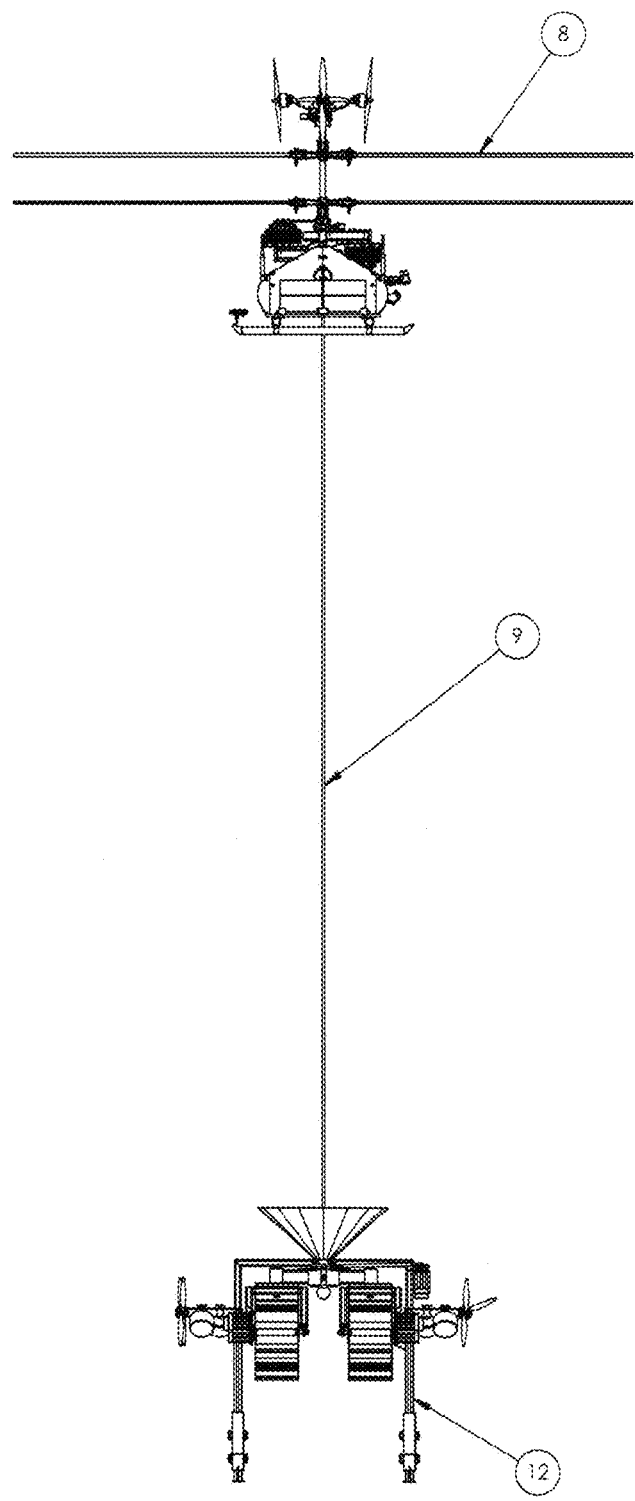
FIG. 14 is an elevation view depicting the unmanned aerial vehicle of FIG. 13 flying the line crawler back to the ground.

The next step is to maneuver UAV 8 into position above line crawler 12, as shown in FIG. 12. Remote pickup device 11 can then be lowered into guide cone 10, as shown in FIG. 13. A signal can then be sent to remote pickup device 11 to command it to mechanically engage with the base of guide cone 10. This reconnects UAV 8 to line crawler 12 via sling 9 whereupon UAV 8 can rise in altitude and begin lifting line crawler 12 off of wire 7 and return line crawler 12 to the ground 15. FIG. 14 shows a depiction of UAV 8 and line crawler 12 in flight.

Figure 15:
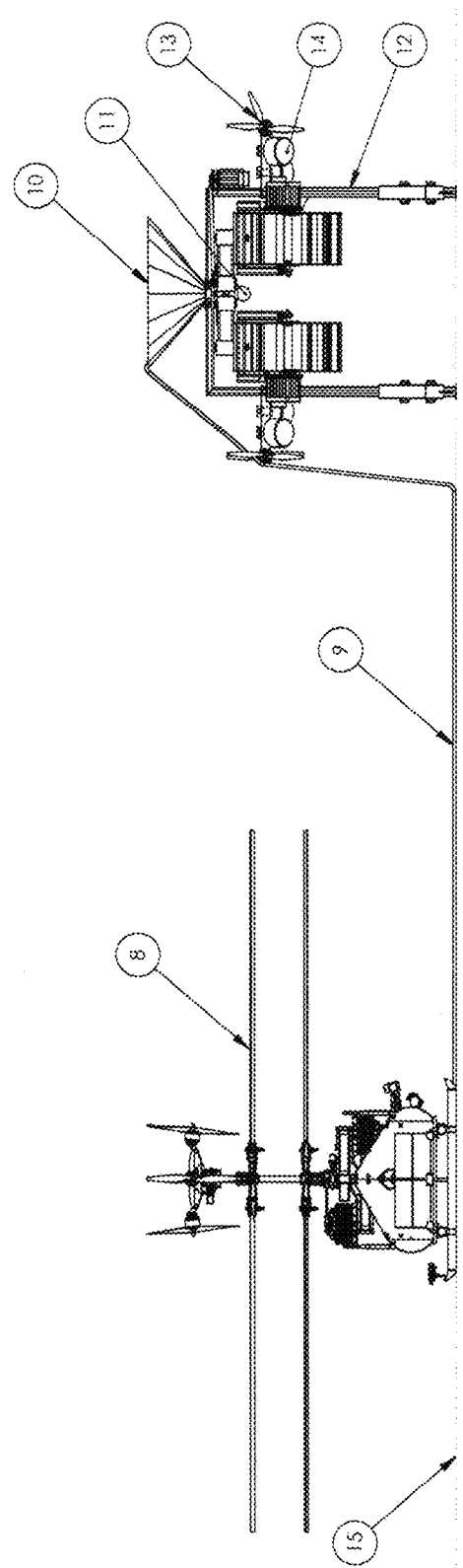
FIG. 15 is an elevation view depicting the line crawler and the unmanned aerial vehicle of FIG. 14 returned to the ground.
Figure 16:
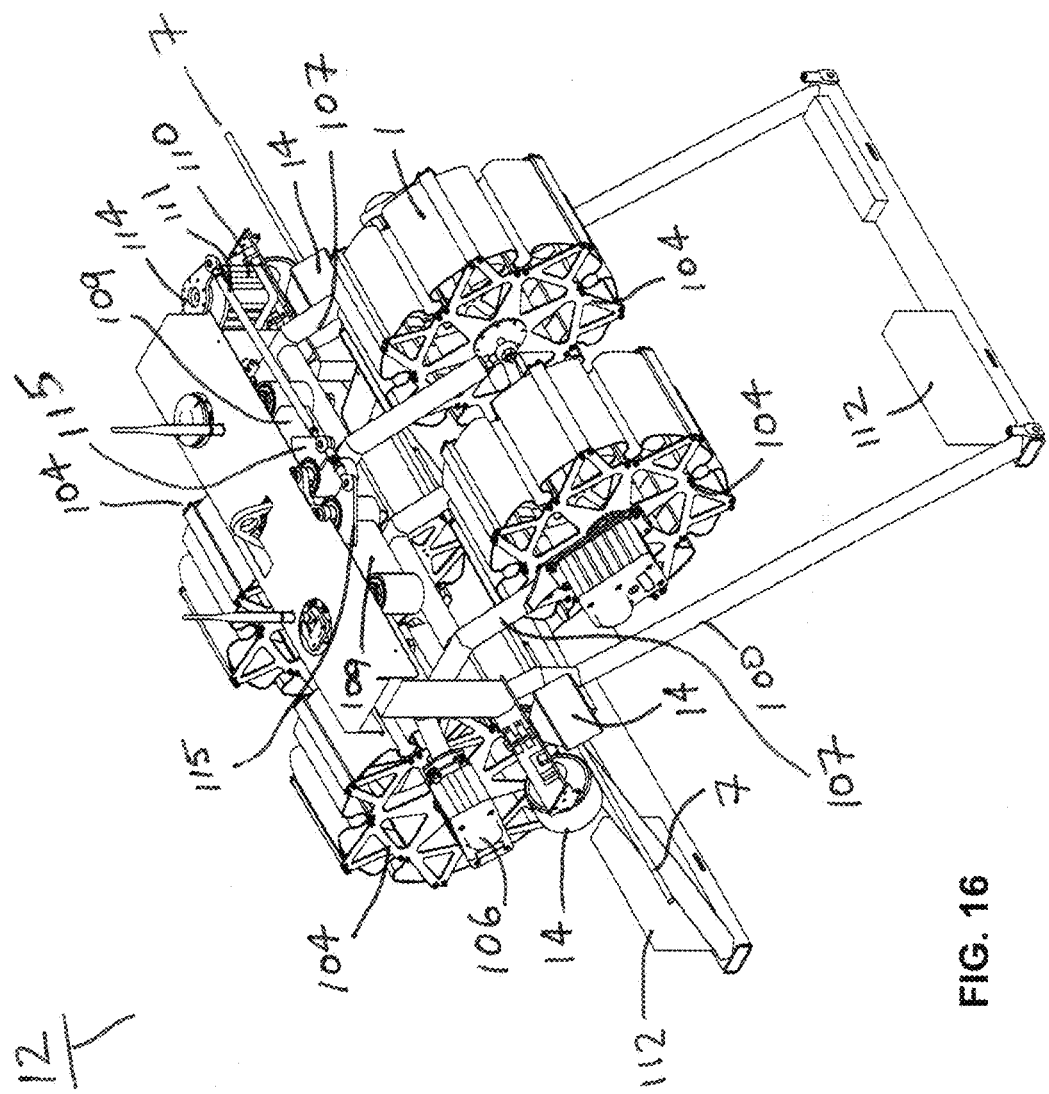
FIG. 16 is a perspective view depicting one embodiment of the line crawler of FIG. 7.

To return line crawler 12 to the ground 15, UAV 8 can be commanded to maneuver to a position above the landing zone. UAV 8 can then be commanded to decrease altitude until line crawler 12 settles on the ground and sling 9 becomes slack. The vertical descent of UAV 8 can then be stopped, and UAV 8 can be commanded to move laterally to ensure adequate lateral clearance between UAV 8 and line crawler 12 when UAV 8 lands. UAV 8 can then be commanded to complete the landing procedure by landing vertically. FIG. 15 shows a depiction of UAV 8 and line crawler 12 once the landing procedure is complete and the machines are resting on ground 15.

At this stage, line crawler 12 can then be reloaded with bird flight diverters 1, have any required maintenance completed, or both whereupon and the entire process of installing bird flight diverters 1 onto wire 7 can be repeated as required.

In some embodiments, line crawler 12 can be lifted onto, and off of, wire 7 using lifting means other than UAV 8, such as with a crane or with a bucket truck 8' which can be connected to line crawler 12 as diagrammatically shown in FIG. 6, as well known to those skilled in the art.

In some embodiments, line crawler 12 can comprise a robotic device configured to traverse wire 7, which can comprise one or more of overhead shield wires, guy wires, optical ground wire, or any cable affixed at either end, and can be further configured to install Bird Flight Diverters as manufactured by Powerline Sentry of Denver, Colorado, USA and described in U.S. Pat. No. 8,438,998.

Referring to FIGS. 16 to 19, in some embodiments, line crawler 12 can comprise of chassis 100, upon which motorized drive wheels 14 can be operatively mounted thereto wherein drive wheels 14 can interface wire 7 and can further provide propulsive force to line crawler 12 to allow it to traverse wire 7. In a representative embodiment, drive wheels 14 can comprise 90 mm Hub Motors as manufactured by Meepo Board of Boise, Idaho, U.S.A. In a representative embodiment, line crawler 12 can comprise four drums 104 operatively coupled thereto, although a greater or fewer number of drums 104 can be fitted as well known to those skilled in the art. In some embodiments, drums 104 can be configured to house and dispense a plurality of bird diverters 1. In a representative embodiment of line crawler 12 as shown in the figures, each drum 104 can be configured to hold six bird diverters 1, although drums 104 can be configured to hold a greater or fewer number of bird diverters 1, as well known to those skilled in the art.

In some embodiments, line crawler 12 can comprise a drum servo 106 operatively coupled to each drum 104, wherein drum servos 106 can be operatively coupled to drum frame 107 and wherein drum servos 106 provide rotary actuation to the drums (4). For the purposes of this description and the claims that follow, the term "servo" can comprise a servo motor or servo mechanism as well known to those skilled in the art. In a representative embodiment, drum servo 106 can comprise a model no. Torxis 1000:1 servo motor as manufactured by GearWurx of Nibley, Utah, U.S.A. In some embodiments, one drum servo 106 can be operatively coupled to each drum 104 to provide independent rotation thereto. In some embodiments, line crawler can comprise of two drum frame assemblies 108 that can further comprise two drums 104 holding twelve bird diverters 1 in total, two drum servos 106 and one drum frame 107 that can be attached to chassis 100 through a four-bar parallelogram linkage, of which the stationary link is chassis 100, and the moving links are two swing-arms 109 and drum frame 107.

In some embodiments, the drum frame parallelogram linkages can be actuated by center servo 110 through the rotation of servo arm 114, one end of which can be connected to the output shaft of center servo 110, and the other end of which can be rotatably connected to one end of link arm 111. The other end of link arm 111 can be rotatably connected to ears 115 that can be connected to two of the four swing-arms 109. In a representative embodiment, center servo 110 can comprise a model no. Torxis 1000:1 servo motor as manufactured by GearWurx of Nibley, Utah, U.S.A. When the output shaft of center servo 110 rotates, servo arm 114 can also rotate thereby imparting motion to link arm 111 that can then rotate swing arms 109 that can cause horizonal motion of drum frame assemblies 108 through the horizontal swinging action of swing-arms 109.

Figure 19:
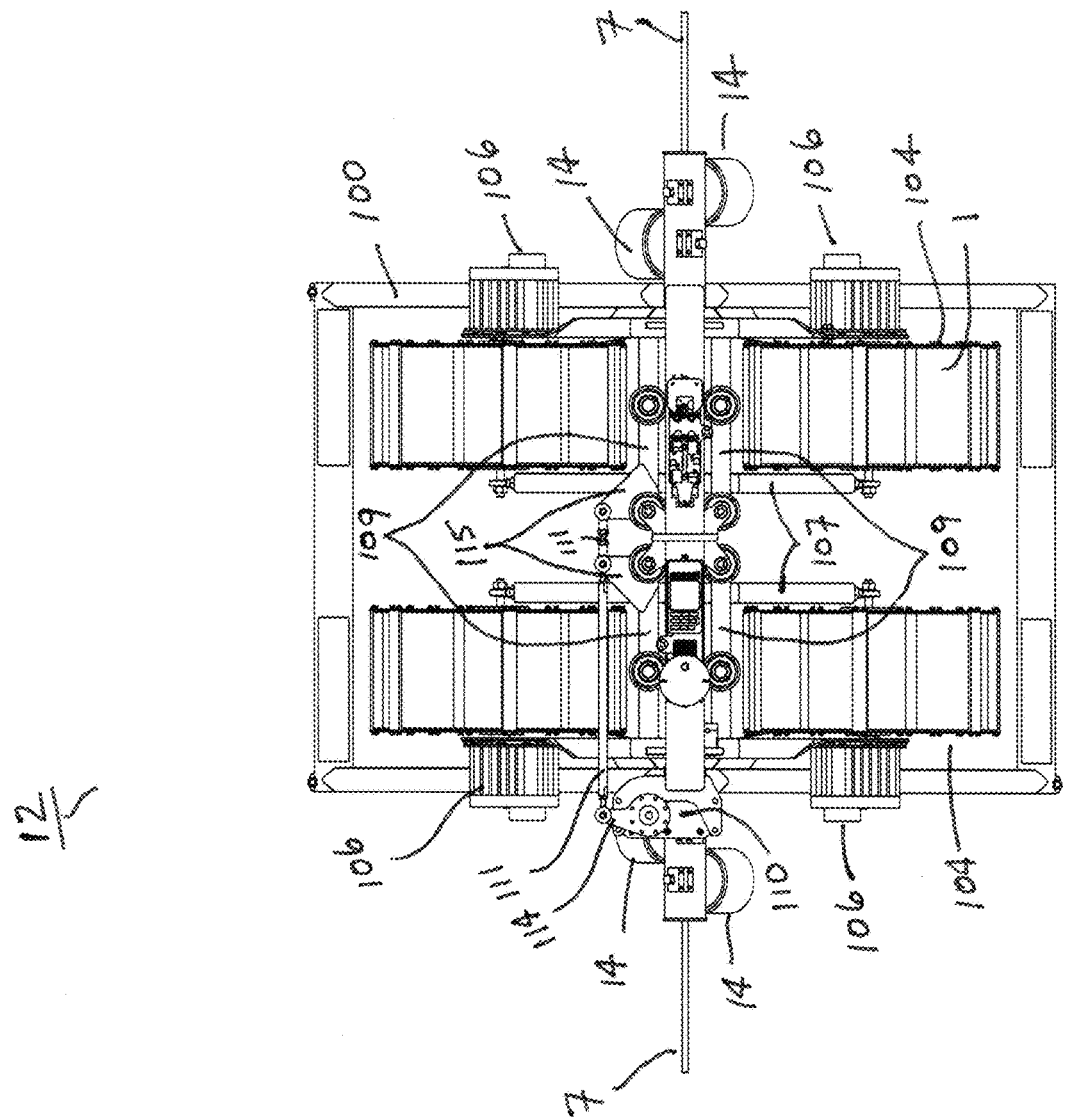
FIG. 19 is a top plan view depicting the line crawler of FIG. 17.
Figure 21:
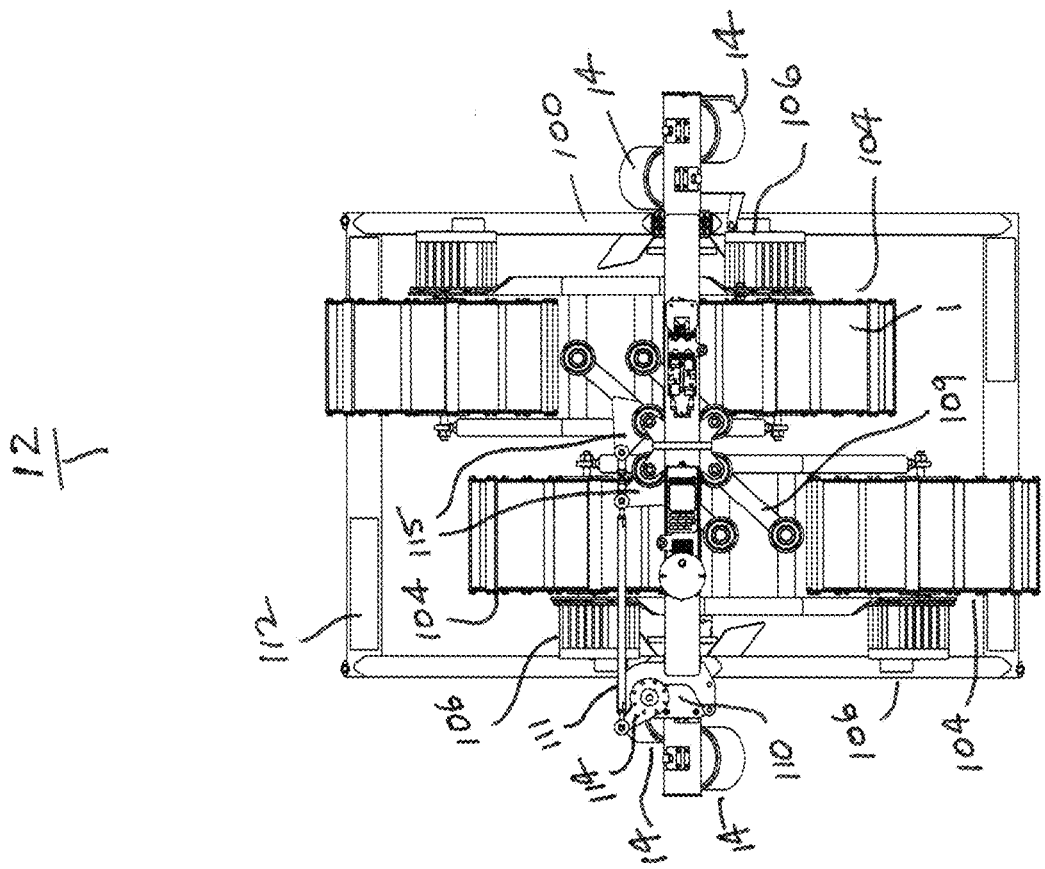
FIG. 21 is a top plan view depicting the line crawler of FIG. 19 with a second pair of bird flight diverter dispensing drums towards the wire.
Figure 20:
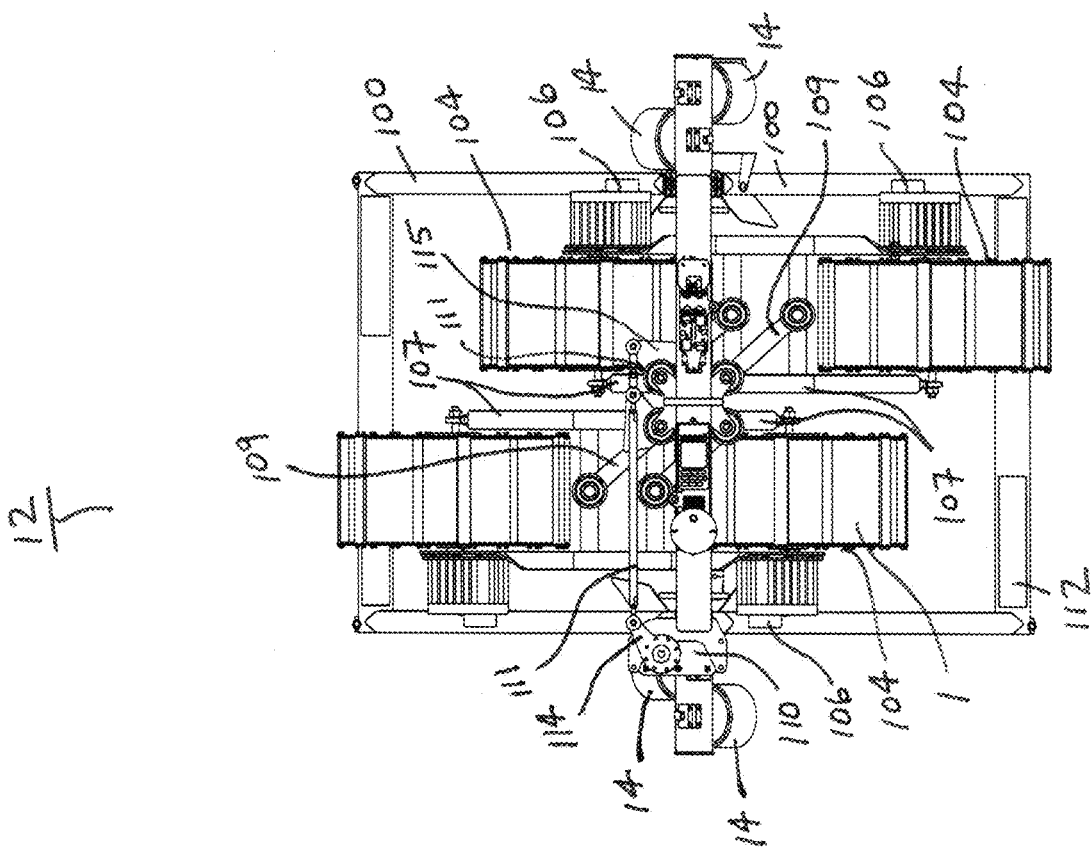
FIG. 20 is a top plan view depicting the line crawler of FIG. 19 with a first pair of bird flight diverter dispensing drums towards the wire.

Referring to FIG. 19, line crawler 12 is shown with center servo 110 in the center position, and drums 104 in the neutral position. Line crawler 12 can be set to this neutral position whenever line crawler 12 traverses along wire 7 due to actuation of motorized drive wheels 14. Referring to FIG. 20, line crawler 12 is shown with center servo 110, servo arm 114, link arm 111, swing-arms 109 and drum frames 107 configured to bring the first pair of drums 104 close to the wire 7 so that the bird diverters 1 disposed on drums 104 can be clipped onto wire 7 as discussed below in this description. Referring to FIG. 21, line crawler 12 is shown with center servo 110, servo arm 114, link arm 111, swing-arms 109 and drum frames 107 configured to bring the final pair of drums 104 close to the wire 7 so that the bird diverters 1 disposed on drums 104 can be clipped onto wire 7 as discussed below in this description. In order to maintain stability of line crawler 12 while on wire 7, the layout of the mechanical linkage as described above ensures that the two drum frame assemblies 108 always move on a horizontal plane in equal and opposite directions during these motions, thus the position of center of mass, as shown by reference numeral 113, of line crawler 12 always remains directly below wire 7, preventing any rocking motion or instability during movement of drum frame assemblies 108 by actuation of center servo 110.

Figures 17, 18:
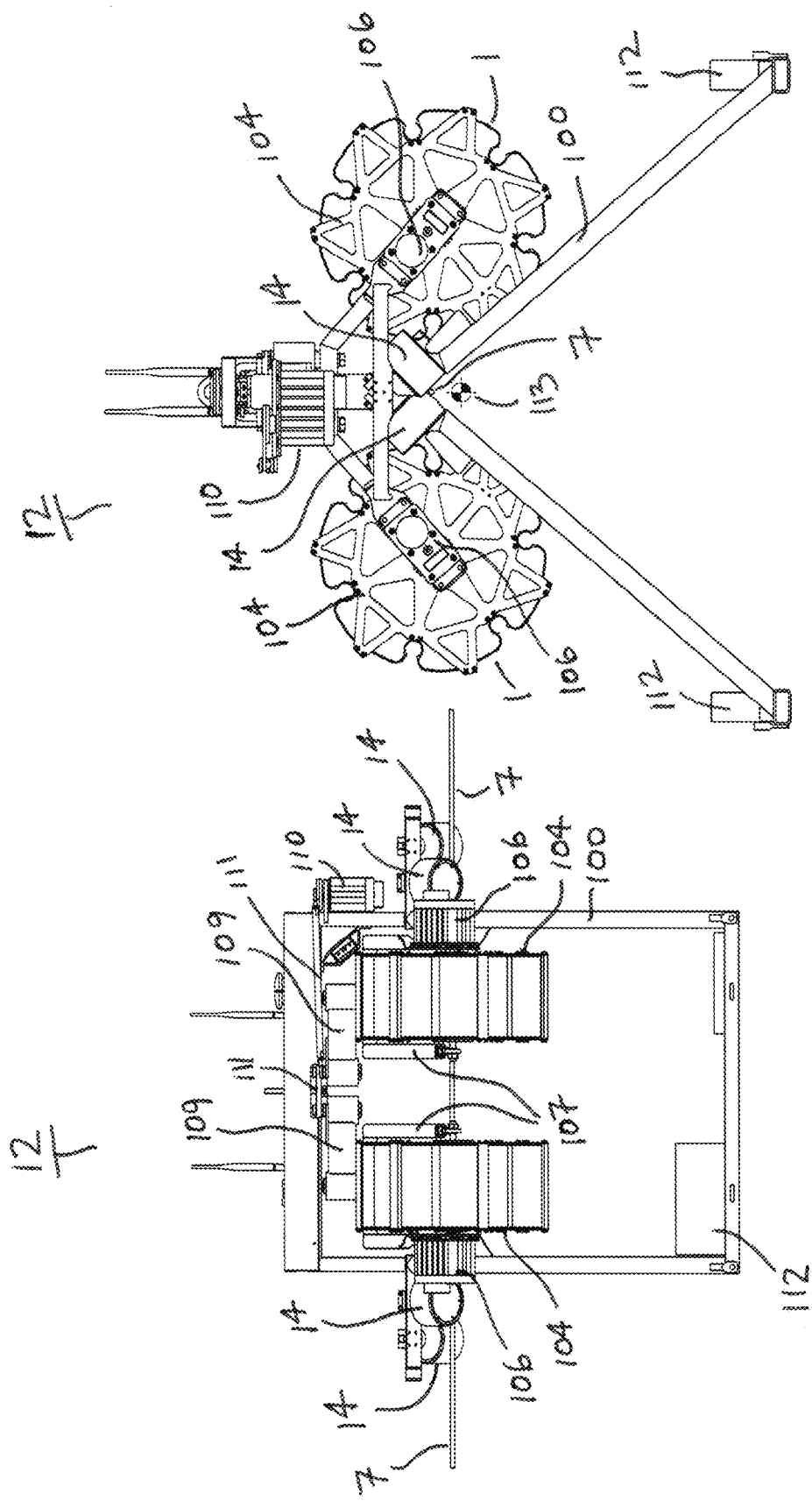
FIG. 17 is a side elevation view depicting the line crawler of FIG. 16 dispose on a wire.
FIG. 18 is a front elevation view depicting the line crawler of FIG. 17.

In some embodiments, line crawler 12 can be powered electrically by two batteries 112 although a greater or fewer number of batteries can be fitted as well known to those skilled in the art. In a representative embodiment, batteries 112 can comprise 4S 22000 maH 14.8 V Lithium Polymer batteries as distributed by Genstattu of Livermore, California, U.S.A. As shown in FIG. 18, batteries 12 can be fitted in a low position on chassis 100 to assist in lowering center of mass 113 of line crawler 12 to a position below wire 7 to ensure stability of line crawler 12 while resting on wire 7. In some embodiments, motorized drive wheels 14 can be mounted at an angle that can provide a V-shaped configuration for contacting wire 7 as line crawler 12 to rest and traverse thereon. This can centralize center of mass 113 directly under wire 7 to aid in the stability of line crawler 12 while resting on wire 7 and to ensure that line crawler 12 can remain level while resting on wire 7.

Figure 22:
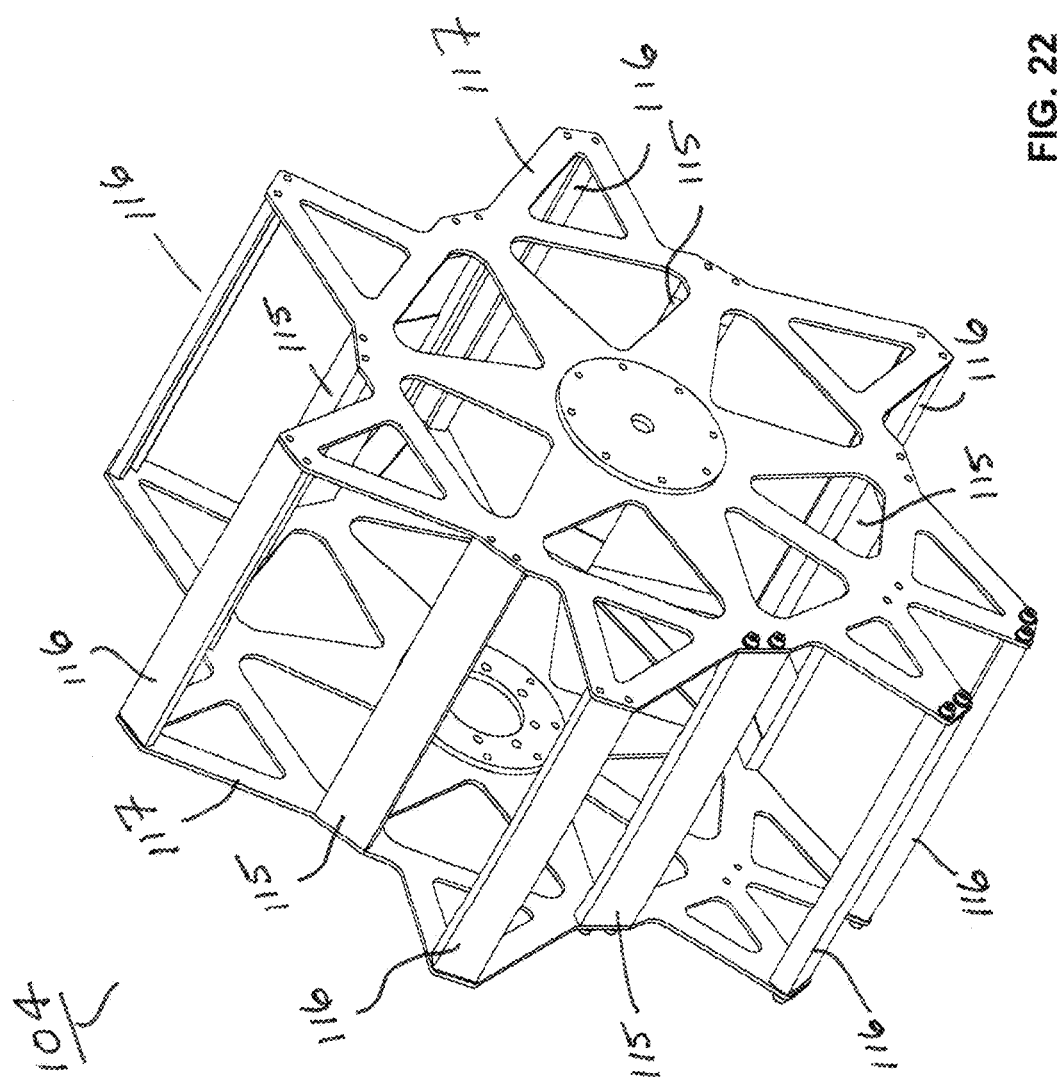
FIG. 22 is a perspective view depicting a bird flight diverter dispensing drum of the line crawler of FIG. 16.

Referring to FIG. 22, an isometric view of drum 104 is shown without bird diverters 1 fitted thereon. In some embodiments, each drum 104 can comprise of two substantially parallel side plates 117, between which can be fitted six barrel bars 115 and seven wing bars 116. Referring to FIG. 23, a sectioned view of a drum 104 is shown loaded with six bird diverters 1. This loading process can be completed by hand by a trained operator. When loaded into the drum, bird diverters 1 can be elastically deformed so that the outer surfaces of barrels 2 are forced against the outer faces of barrel bars 115. A detail view of how wings 3 of bird diverters 1 can be held in wing bars 116 is shown in FIG. 24. In some embodiments, the tip of one of the wings 3 of bird diverters 1 can be inserted into rectangular recess 22 that can be cut into the inner surface of wing bars 116. The tip of the opposing wing 3 rests on the inner surface of the neighboring bird diverter 1 at position 23. Where there is no neighboring bird diverter 1 for wing 3 to rest on, the wing 3 can then instead rest on the inner edge of wing bar 116, shown as position 24 in FIG. 23.

FIG. 25 shows a starting position and configuration of one of the two drum frame assemblies 108 before beginning to install the first bird diverter 1. In some embodiments, drum frame assemblies 108 can be configured in line crawler 12 so that the horizontal axis of rotation 27 of drums 104 can be located on the same horizontal plane 25 as the centerline of wire 7. Prior to the installation sequence, the drum 104 housing the bird diverter 1 that is about to be installed can be rotated by servo 106 about drum rotational axis 27 so that centerline axis 28 of barrel 2 of said bird diverter 1 can be located on the same horizontal plane 25 as the centerline of wire 7.

FIG. 26 shows the first motion required to install bird diverter 1. Center servo 110 and the linkage mechanism connected to it, as described above, can be actuated in such a manner as to move drum frame assembly 108 sideways relative to wire 7 in the direction indicated by 29. This motion continues until wire 7 is positioned largely concentrically inside barrel 2 of bird diverter 1, as shown in FIG. 27.

FIG. 28 shows the second motion required to install bird diverter 1. In this step, drum 104 can be rotated in the clockwise direction as indicated by 30 by drum servo 106 about the axis of rotation 27. This can cause the lower inside surface of barrel 2 to touch the lower side of wire 7 as shown in FIG. 30 thereby causing the upward motion of bird diverter 1 to cease. Further rotation of drum 104 in direction 30 causes the outer surface of barrel bar 115 to slide upwards relative to barrel 2 of bird diverter 1. It also causes the upper wing 3 of bird diverter 1 to be pulled out of rectangular recess 22 in wing bar 116, as shown in FIG. 29. Once this motion has reached the point where the tip of wing 3 moves past tip 31 of wing bar 116, bird diverter 1 quickly returns to its original, undeformed shape as shown in FIG. 31 and FIG. 32. This causes barrel 2 of bird diverter 1 to encircle and trap wire 7, securing bird diverter 1 onto wire 7.

Figures 33, 34, 35:
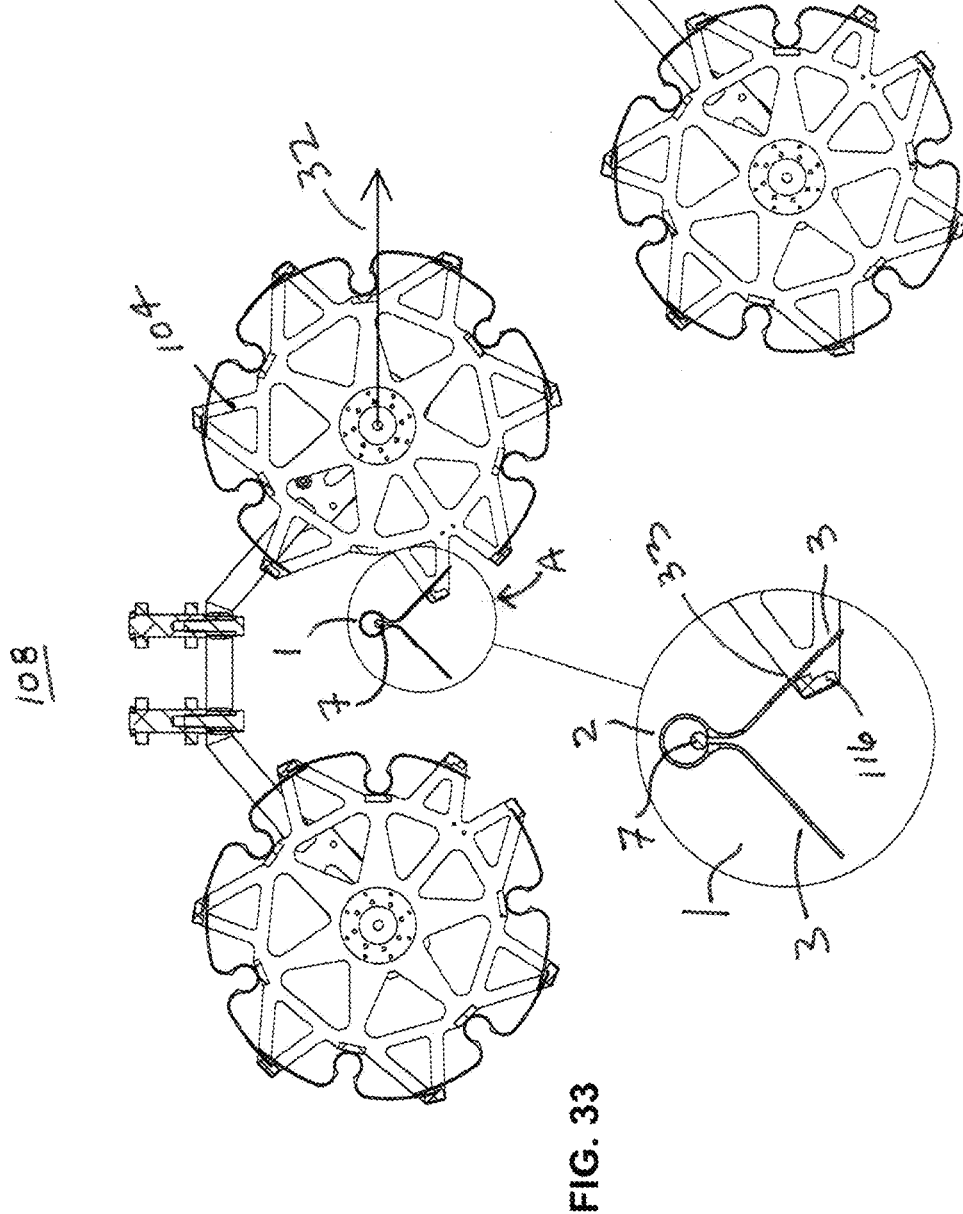
FIG. 33 is a front elevation view depicting the drum frame assemblies of the line crawler of FIG. 20 in a third motion after the bird flight diverter has installed on the wire.
FIG. 34 is a front elevation view depicting Detail A of FIG. 33.
FIG. 35 is a front elevation view depicting the drum frame assemblies of the line crawler of FIG. 20 in a further motion after the bird flight diverter was installed on the wire where the drum frame assembles are moved clear of the installed bird flight diverter.

Referring to FIGS. 33, 34 and 35, the third sequence of motions required to complete the installation of bird diverter 1 is shown. Initially, center servo 110 and the linkage mechanism connected to it, as described above, can be actuated in such a manner as to move drum frame assembly 108 sideways relative to wire 7 in the direction indicated by reference numeral 32. During this motion, edge (33) of wing bar 116 can touch the inside surface of wing 3 of bird diverter 1, as shown in FIG. 34, thereby rotating bird diverter 1 about wire 7 until bird diverter 1 is positioned largely in a substantially vertical configuration as shown in FIG. 33. Once bird diverter 1 is positioned at the substantially vertical position as shown, drum servo 106 can rotate drum 104 about axis 27 in the counter-clockwise direction indicated by reference numeral 34. This can prevent edge 33 of wing bar 116 from contacting the inside surface of wing 3 of bird diverter 1 during the remainder of motion 32, leaving bird diverter 1 in a substantially vertical configuration once motion 32 has been completed, as shown in FIG. 35.

The final motion required to complete the installation of bird diverter 1 is shown in FIGS. 36 and 37. In this step, motorized drive wheels 14 can be used to translate line crawler 12 along wire 7 in the desired direction of travel. Motorized drive wheels 14 can roll over the upper surface of barrel 2 of the recently installed bird diverter 1, and legs 35 that form part of chassis 100 can be angled in such a configuration so there is adequate clearance between legs 35 and the tips of wings 3 to enable chassis 100 of line crawler 12 to move over installed bird diverter 1 without hitting legs 35.

Figure 38:
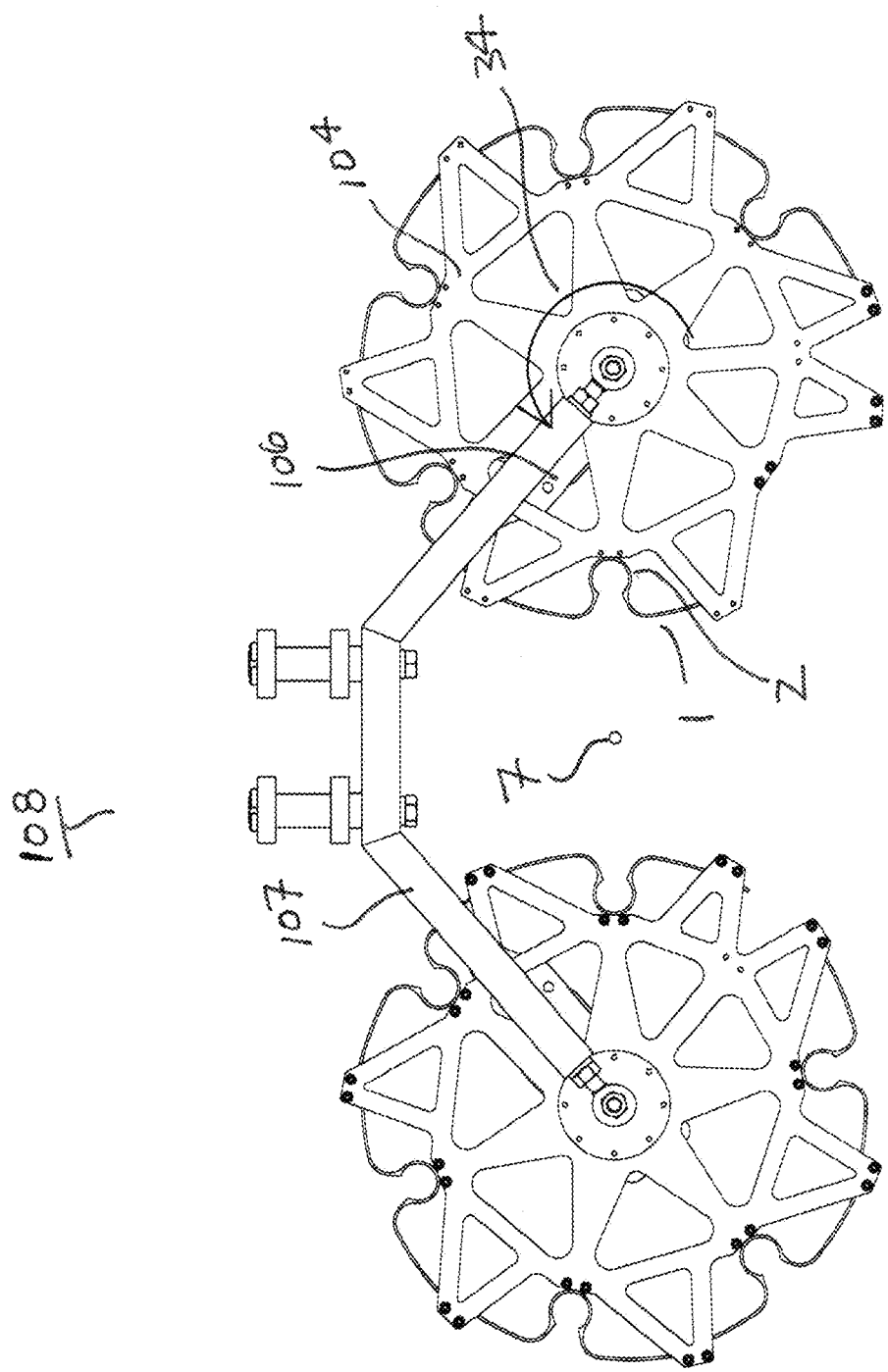
FIG. 38 is a front elevation view depicting the drum frame assemblies of the line crawler of FIG. 36 in a position to install another bird flight diverter on the wire.

FIG. 38 shows how drum frame assembly 108 can be configured to install the next bird diverter 1 in the sequence. Servo 106 can be used to rotate drum 104 in such a way as to horizontally align barrel 2 of the next bird diverter 1 disposed in drum 104 with wire 7. By repeating the steps listed above, the remaining bird diverters 1 of this drum 104 can be clipped onto wire 7 the same manner.

Figure 39:
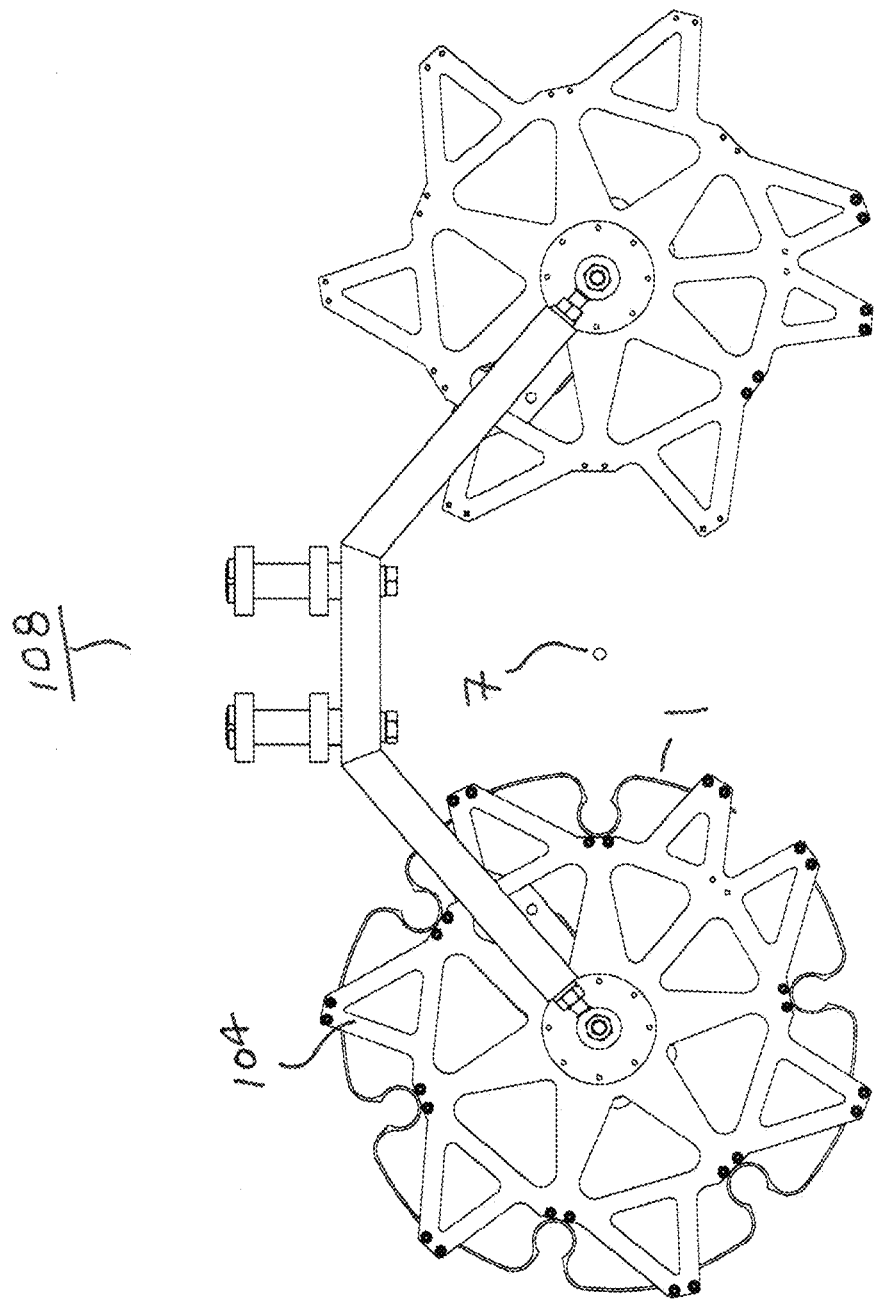
FIG. 39 is a front elevation view depicting the drum frame assemblies of the line crawler of FIG. 38 after all the bird flight diverters from one drum of the drum frame assemblies have been installed on the wire.

By repeating the steps listed above, but with the motions described mirrored, bird diverters 1 loaded into the opposing drum 104 of drum frame assembly 108 can be subsequently clipped to wire 7 well, as shown in FIG. 39. Once this is complete, the bird diverters 1 loaded into the second drum frame assembly 108 can then be clipped onto wire 7 using similar motions.

Figure 40:
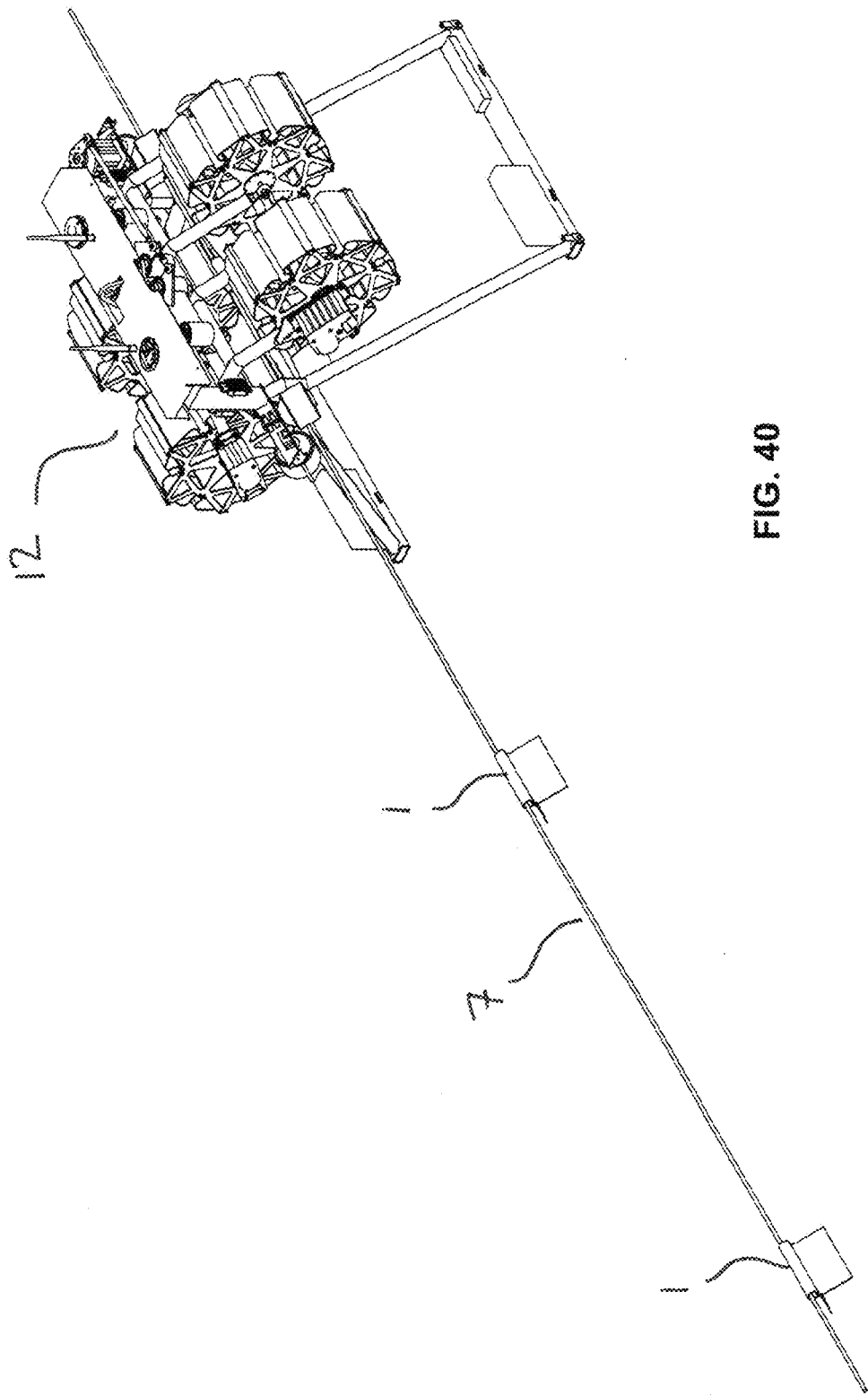
FIG. 40 is a perspective view depicting a line crawler traversing a wire after dispensing bird flight diverters on the wire.

Referring to FIG. 40, an isometric view of line crawler 12 is shown travelling down wire 7 with bird diverters 1 spaced at regular intervals along wire 7. In some embodiments, this is how line crawler 12 can be used operationally to install bird diverters 1 on wires 7.

Figure 41:
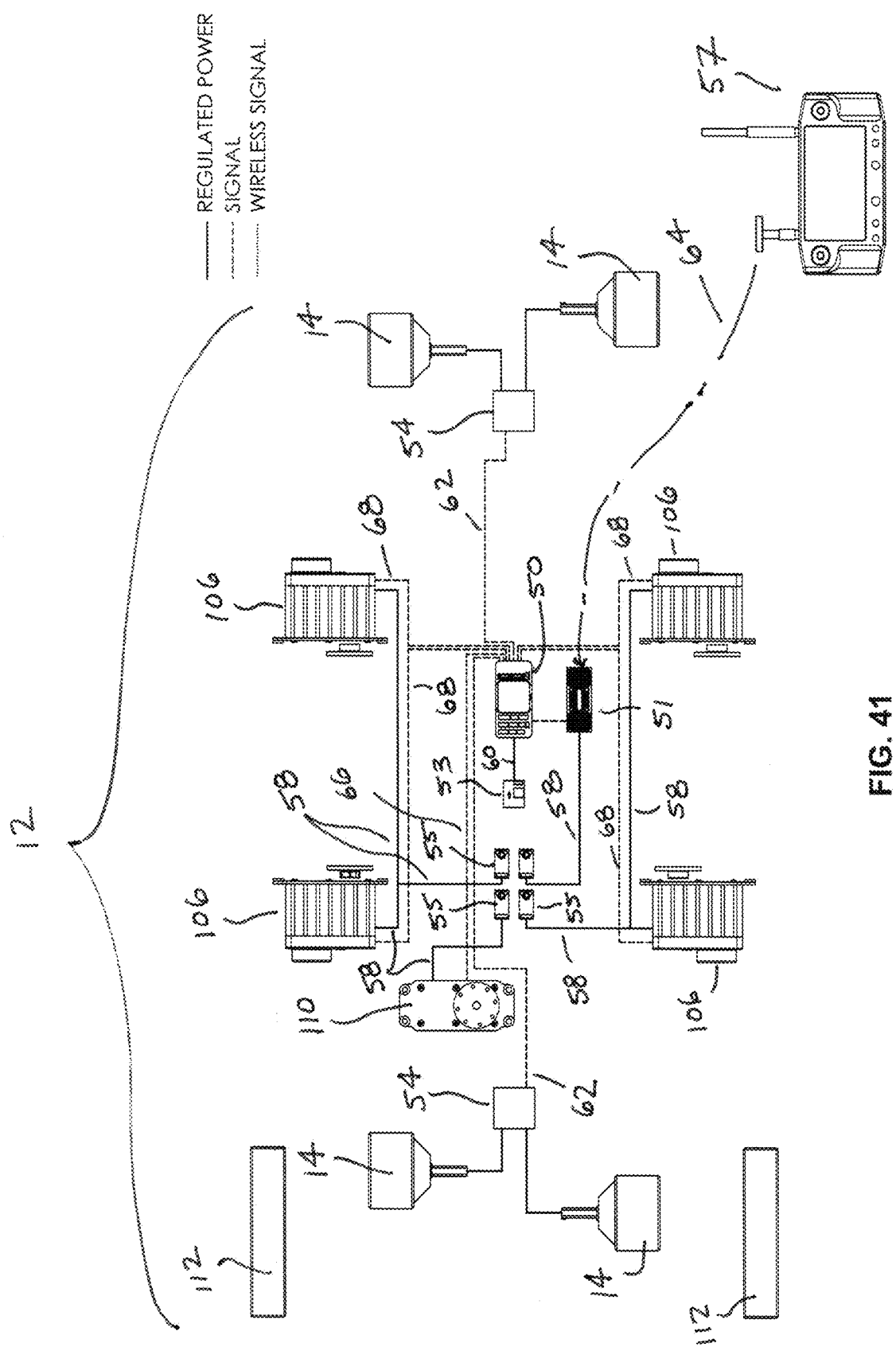
FIG. 41 is a block diagram depicting the control of the line crawler of FIG. 16 with a handheld transmitter.

Referring to FIG. 41, a block diagram shows how, in some embodiments, an operator can use handheld transmitter 57 to request line crawler 12 to perform the required functions. In some embodiments, handheld transmitter 57 can interpret commands from the operator in data and can then send that data wirelessly via wireless data signal 64 to receiver unit 51. In some embodiments, handheld transmitter 57 can comprise a Herelink Transmitter as manufactured by Hex Aero located in Sha Tin, Hong Kong. In some embodiments, receiver unit 51 can comprise a Herelink Receiver as manufactured by Hex Aero located in Sha Tin, Hong Kong.

In some embodiments, receiver unit 51 can receive and decode wireless data 64 and forward received data signal 61 to control unit 50. In some embodiments, control unit 50 can comprise a Pixhawk Cube Black Controller as manufactured by Hex Aero located in Sha Tin, Hong Kong. Rotation of drive wheels 14 can be achieved by sending a request from control unit 50 to the brushless direct current ("DC") electronic speed controllers 54 via drive wheel signal 62 that can vary the input voltage (and, thus, output torque) to drive wheels 14. In some embodiments, speed controllers 54 can comprise a Dual FSESC4.20 Plus controller as manufactured by Flipsky located in Dongguan City, China. In some embodiments, rotation of center servo 110 can be achieved by sending a target angle via center servo signal 66 from control unit 50 to center servo 110. Likewise, in some embodiments, rotation of drum servos 106 can be achieved by sending a target angle via drum servo signal 68 from control unit 50 to one or more the drum servos 106.

Referring to FIG. 41, in some embodiments, regulated 12-volt DC power can be supplied from voltage regulators 55 over power lines 58 to: center servo 110; drum servos 106; and receiver 51. In some embodiments, regulated 5-volt DC power can be supplied from power module 53 over power line 60 to control unit 50. In some embodiments, voltage regulators 55 can comprise a CC BEC 2.0 WP battery eliminator circuit as manufactured by Castle Creations located in Olathe, Kansas, U.S.A. In some embodiments, power module 53 can comprise a CUAV HV PM power module as manufactured by Cuav Inc. Co. located in Guangzhou City, China.

Figure 42:
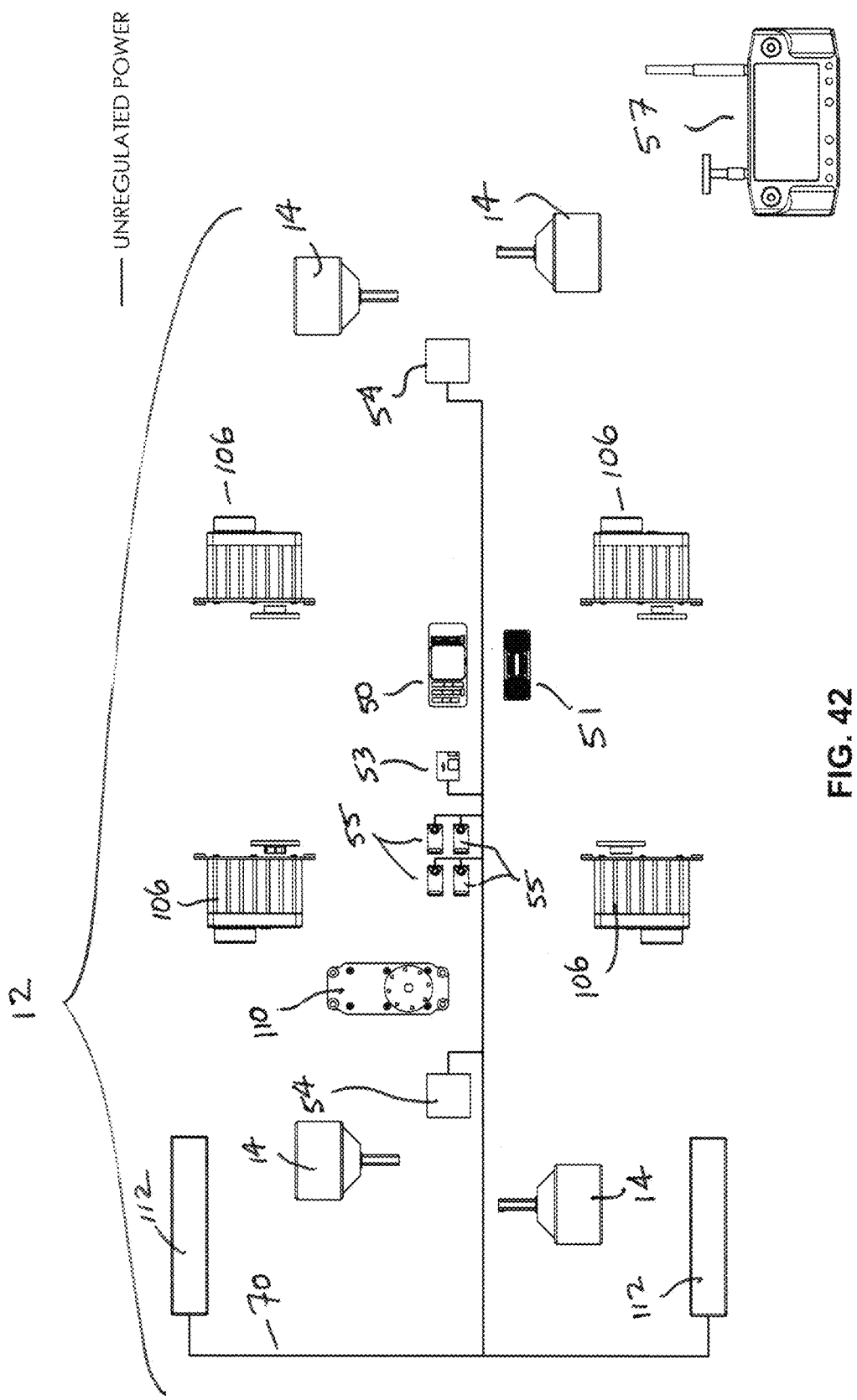
FIG. 42 is a block diagram depicting the distribution of unregulated power in the line crawler of FIG. 16.

Referring to FIG. 42, the distribution of unregulated power from batteries 112 over power lines 70 is shown. Batteries 112 can comprise one or more battery of any voltage, wherein a plurality of battery units can be connected in parallel or series as well known to those skilled in the art. In representative embodiments, batteries 112 can comprise a nominal voltage in the range of 12 to 36 volts DC, wherein batteries 112 can further comprise an amp-hour capacity in the range of 2 to 50 Amp-Hours. In some embodiments, unregulated power from batteries 112 can be supplied to: speed controllers 54; voltage regulators 55; and power module 53.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for installing a plurality of bird flight diverters onto a bngitudina I length of a wire, the method comprising:
    a) attaching a lifter to a robotic line crawler, the robotic line crawler configured to hold one or more of the plurality of the bird flight diverters, and wherein the robotic line crawler comprises: a) a chassis comprising a plurality of motorized drive wheels operatively coupled thereto, wherein the plurality of motorized drive wheels are configured to travel abng the wire; b) at least one drum assembly operatively coupled to the chassis via a linkage mechanism configured to move the at least one drum assembly side to side within the chassis, wherein the at least one drum assembly further comprises: i) a drum frame comprising a pair of drums rotatably coupled thereto wherein each drum is configured to releasably hold the plurality of bird flight diverters, and ii) a drum servo motor operatively coupled to each drum, wherein the drum servo motor is configured to rotate the drum in the drum frame; and c) a battery configured to provide direct current ("DC") power, the battery operatively coupled to the motorized drive wheels, to the linkage mechanism, and to the drum servo motors to provide DC power thereto;
    b) lifting the robotic line crawler with the lifter off of a ground surface;
    c) placing the robotic line crawler on the wire, the robotic line crawler further configured to traverse abng the bngitudinal length of the wire;
    d) moving the robotic line crawler abng the bngitudinal length of the wire; and
    e) installing one or more of the plurality of the bird flight diverters on the wire with the robotic line crawler at pre-determined spaced-apart intervals abng the wire.

2. The method as set forth in claim 1, further releasing the robotic line crawler from the lifter after the robotic line crawler is placed on the wire.

3. The method as set forth in claim 1, further comprising lifting the robotic line crawler from the wire with the lifter after the robotic line crawler has placed one or more of the plurality of bird flight diverters onto the wire.

4. The method as set forth in claim 3, further comprising returning the robotic line crawler to the ground surface.

5. The method as set forth in claim 4, further comprising loading one or more of the plurality of bird flight diverters onto the robotic line crawler and repeating steps a)-e).

6. The method as set forth in claim 4, further comprising performing maintenance on the robotic line crawler.

7. The method as set forth in claim 3, further comprising attaching the lifter to the robotic line crawler with a sling prior to lifting the robotic line crawler off of the wire, the sling further comprising a remote pickup device configured to releasably attach to a guide cone disposed on the robotic line crawler.

8. The method as set forth in claim 7, further comprising returning the robotic line crawler to the ground surface and releasing the remote pickup device from the guide cone after the robotic line crawler is placed on the ground surface.

9. The method as set forth in claim 1, further comprising attaching the lifter to the robotic line crawler with a sling prior to lifting the robotic line crawler off of the ground surface, the sling further comprising a remote pickup device configured to releasably attach to a guide cone disposed on the robotic line crawler.

10. The method as set forth in claim 9, further comprising releasing the remote pickup device from the guide cone after the robotic line crawler is placed on the wire.

11. The method as set forth in claim 1, wherein the lifter comprises one or more of an unmanned aerial vehicle, a crane and a bucket truck.

12. The method as set forth in claim 1, wherein the wire comprises an electric power line or a guy wire.

13. The method as set forth in claim 1, wherein each drum comprises:
   a) a pair of substantially parallel side plates;
   b) a plurality of barrel bars disposed between the side plates, the number of the plurality of barrel bars equaling the number of the bird flight diverters disposed in the drum; and
   c) a plurality of wing bars disposed between the side plates, the number of the plurality of wing bars equaling the number of the bird flight diverters disposed in the drum plus one additional wing bar.

14. The method as set forth in claim 1, wherein the linkage mechanism comprises:
   a) a center servo motor operatively coupled to the battery;
   b) a servo arm operatively coupled to the center servo motor;
   c) a plurality of swing arms rotatively coupled to the chassis, the plurality of swing arms operatively coupled to the drum frame; and
   d) a link arm operatively coupling the servo arm to the plurality of swing arms wherein rotation of the servo arm translates to side to side movement of the at least one drum assembly in the chassis.

15. The method as set forth in claim 1, wherein the robotic line crawler further comprises a control unit operatively coupled to the motorized drive wheels, to the linkage mechanism, and to the drum servo motors.

16. The method as set forth in claim 15, further comprising a wireless receiver operatively coupled to the control unit, the wireless receiver configured for receiving a wireless data signal configured to control the motorized drive wheels, the linkage mechanism, and the drum servo motors.

17. The method as set forth in claim 16, further comprising a wireless transmitter configured for transmitting the wireless data signal.

18. A system for installing a plurality of bird flight diverters onto a longitudinal length of a wire, the system comprising: a robotic line crawler wherein the robotic line crawler comprises: a) a chassis comprising a plurality of motorized drive wheels operatively coupled thereto, wherein the plurality of motorized drive wheels are configured to travel abng the wire; b) at least one drum assembly operatively coupled to the chassis via a linkage mechanism configured to move the at least one drum assembly side to side within the chassis, wherein the at least one drum assembly further comprises: i) a drum frame comprising a pair of drums rotatably coupled thereto wherein each drum is configured to releasably hold the plurality of bird flight diverters, and ii) a drum servo motor operatively coupled to each drum, wherein the drum servo motor is configured to rotate the drum in the drum frame; and c) a battery configured to provide direct current ("DC") power, the battery operatively coupled to the motorized drive wheels, to the linkage mechanism, and to the drum servo motors to provide DC power thereto, the robotic line crawler configured to traverse abng the bngitudinal length of the wire, the robotic line crawler further configured to hold the plurality of bird flight diverters, the robotic line crawler further configured to install one or more of the plurality of bird flight diverters on the wire.

19. The system as set forth in claim 18, further comprising a lifter configured to attach to the robotic line crawler and lift the robotic line crawler off of a ground surface and place the robotic line crawler on the wire.

20. The system as set forth in claim 19, wherein the lifter is configured to release the robotic line crawler after the robotic line crawler is placed on the wire.

21. The system as set forth in claim 19, wherein the lifter is configured to lift the line crawler from the wire after the robotic line crawler has placed one or more of the plurality of bird flight diverters onto the wire.

22. The system as set forth in claim 21, wherein the lifter is configured to return the robotic line crawler to the ground surface.

23. The system as set forth in claim 22, wherein the robotic line crawler is loaded with one or more of the plurality of bird flight diverters.

24. The system as set forth in claim 19, wherein the lifter further comprises a sling, the sling comprising a remote pickup device configured to releasably attach to a guide cone disposed on the robotic line crawler.

25. The system as set forth in claim 24, wherein the remote pickup device is configured to release from the guide cone after the robotic line crawler is placed on the wire.

26. The system as set forth in claim 25, wherein the remote pickup device is configured to attach to the guide cone after the robotic line crawler has placed one or more of the plurality the bird flight diverters onto the wire.

27. The system as set forth in claim 26, wherein the lifter is configured to lift the robotic line crawler off of the wire and return the robotic line crawler to the ground surface.

28. The system as set forth in claim 19, wherein the lifter comprises one or more of an unmanned aerial vehicle, a crane and a bucket truck.

29. The system as set forth in claim 18, wherein the wire comprises an electric power line or a guy wire.

30. The system as set forth in claim 18, wherein each drum comprises:
   a) a pair of substantially parallel side plates;
   b) a plurality of barrel bars disposed between the side plates, the number of the plurality of barrel bars equaling the number of the bird flight diverters disposed in the drum; and
   c) a plurality of wing bars disposed between the side plates, the number of the plurality of wing bars equaling the number of the bird flight diverters disposed in the drum plus one additional wing bar.

31. The system as set forth in claim 18, wherein the linkage mechanism comprises:
   a) a center servo motor operatively coupled to the battery;
   b) a servo arm operatively coupled to the center servo motor;
   c) a plurality of swing arms rotatively coupled to the chassis, the plurality of swing arms operatively coupled to the drum frame; and
   d) a link arm operatively coupling the servo arm to the plurality of swing arms wherein rotation of the servo arm translates to side to side movement of the at least one drum assembly in the chassis.

32. The system as set forth in claim 18, wherein the robotic line crawler further comprises a control unit operatively coupled to the motorized drive wheels, to the linkage mechanism, and to the drum servo motors.

33. The system as set forth in claim 32, further comprising a wireless receiver operatively coupled to the control unit, the wireless receiver configured for receiving a wireless data signal configured to control the motorized drive wheels, the linkage mechanism, and the drum servo motors.

34. The system as set forth in claim 19, further comprising a wireless transmitter configured for transmitting the wireless data signal.

\* \* \* \* \*

UNITED STATES PATENT AND TRADEMARK OFFICE
CERTIFICATE OF CORRECTION

PATENT NO. : 11,787,038 B2  
APPLICATION NO. : 17/181297  
DATED : October 17, 2023  
INVENTOR(S) : Daniel John Clarke and Romas Krivelis Page 1 of 1

It is certified that error appears in the above-identified patent and that said Letters Patent is hereby corrected as shown below:

In the Claims

Column 12, Line 3 change "bngitudina l" to "longitudinal"; Lines 11, 31, 33 and 37 change each occurrence of "abng" to "along"; and Lines 32 and 33 change each occurrence of "bngitudinal" to "longitudinal".

Column 13, Lines 52 and 66 change each occurrence of "abng" to "along"; and Line 66 change "bngitudinal" to "longitudinal".

Column 15, Line 6 change "19" to "33".

Signed and Sealed this  
Thirteenth Day of February, 2024

Katherine Kelly Vidal  
*Director of the United States Patent and Trademark Office*